United States Patent
Kitano et al.

(10) Patent No.: US 12,523,647 B2
(45) Date of Patent: Jan. 13, 2026

(54) METHOD FOR EVALUATING ANTICANCER EFFECT AND METHOD FOR PREDICTING EFFECTIVENESS OF CANCER IMMUNOTHERAPY

(71) Applicant: TOPPAN PRINTING CO., LTD., Taito-ku (JP)

(72) Inventors: Shiro Kitano, Taito-ku (JP); Kei Tsukamoto, Taito-ku (JP); Rii Morimura, Taito-ku (JP); Shinji Irie, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 785 days.

(21) Appl. No.: 16/797,542

(22) Filed: Feb. 21, 2020

(65) Prior Publication Data

US 2020/0191773 A1     Jun. 18, 2020

Related U.S. Application Data

(63) Continuation of application No. PCT/JP2018/030765, filed on Aug. 21, 2018.

(30) Foreign Application Priority Data

Aug. 21, 2017   (JP) ................................ 2017-158899

(51) Int. Cl.
*G01N 33/50*     (2006.01)

(52) U.S. Cl.
CPC ................................ *G01N 33/5011* (2013.01)

(58) Field of Classification Search
None
See application file for complete search history.

(56) References Cited

U.S. PATENT DOCUMENTS

| | | | |
|---|---|---|---|
| 5,032,508 A | 7/1991 | Naughton et al. | |
| 11,249,070 B2 * | 2/2022 | Kitano | C12N 5/0693 |
| 2010/0255528 A1 * | 10/2010 | Zudaire | G01N 33/5005 |
| | | | 435/29 |
| 2014/0155292 A1 | 6/2014 | Fang et al. | |
| 2015/0111240 A1 | 4/2015 | Wamhoff et al. | |
| 2016/0097039 A1 | 4/2016 | Nguyen et al. | |
| 2017/0131264 A1 | 5/2017 | Nguyen et al. | |
| 2019/0041381 A1 | 2/2019 | Nguyen et al. | |
| 2019/0049432 A1 | 2/2019 | Kitano et al. | |

FOREIGN PATENT DOCUMENTS

| | | | |
|---|---|---|---|
| EP | 0 358 506 A2 | 3/1990 | |
| JP | 3594978 B2 | 12/2004 | |
| JP | 4866162 B2 * | 2/2012 | |
| JP | 2016-535591 A | 11/2016 | |
| JP | WO2017/183673 A1 | 10/2017 | |
| WO | WO-2015061372 A1 * | 4/2015 | ............. C12N 5/067 |

OTHER PUBLICATIONS

BD Biosciences. BD Matrigel Matrix Frequently Asked Questions. (Year: 2011).*
Isella et al., "Stromal contribution to the colorectal cancer transcriptome", Nature Genetics, vol. 47, 2015, pp. 312-319.
Shimoda et al., "Carcinoma-associated fibroblasts are a rate-limiting determinant for tumour progression", Seminars in Cell & Developmental Biology, vol. 21(1), 2010, pp. 19-25.
Brambilla et al., "Prognostic Effect of Tumor Lymphocytic Infiltration in Resectable Non-Small-Cell Lung Cancer", Journal of Clinical Oncology, vol. 34(11), 2016, pp. 1223-1230.
Nishiguchi et al., "Cell-Cell Crosslinking by Bio-Molecular Recognition of Heparin-Based Layer-by-Layer Nanofilmsa", Macromolecular Bioscience, vol. 15(3), 2015, pp. 312-317.
Sanmamed et al., "Nivolumab and Urelumab Enhance Antitumor Activity of Human T Lymphocytes Engrafted in $Rag2^{-/-}$ $IL2R_\gamma^{null}$ Immunodeficient Mice", Cancer Research, vol. 75(17), 2015, pp. 3466-3478.
Le et al., "PD-1 Blockade in Tumors with Mismatch-Repair Deficiency", The New England Journal of Medicine, vol. 372(26), 2015, pp. 2509-2520.
Hironori Yamazoe, "Fabrication of novel culture system composed of cancer cells and cancer stromal cells for in vitro evaluation of anticancer drugs", Research Performance Report on Scientific Research Fundraising Business, 2014, pp. 1-5 (with English Abstract).
International Search Report issued Nov. 20, 2018 in PCT/JP2018/030765, filed Aug. 21, 2018, (with English Translation).
Extended European Search Report issued Jul. 9, 2020 in corresponding European Patent Application No. 18847953.9, 12 pages.

* cited by examiner

*Primary Examiner* — Nghi V Nguyen
(74) *Attorney, Agent, or Firm* — Oblon, McClelland, Maier & Neustadt, L.L.P.

(57) ABSTRACT

A method for testing an anticancer effect including culturing a cell structure including cancer cells and stromal cells in a presence of an anticancer drug and immune cells, and measuring the number of living cancer cells in the cell structure after the culturing, as an indicator of an anticancer effect of the anticancer drug or the immune cells.

16 Claims, 2 Drawing Sheets

METHOD FOR EVALUATING ANTICANCER EFFECT AND METHOD FOR PREDICTING EFFECTIVENESS OF CANCER IMMUNOTHERAPY

CROSS-REFERENCE TO RELATED APPLICATIONS

The present application is a continuation of International Application No. PCT/JP2018/030765, filed Aug. 21, 2018, which is based upon and claims the benefits of priority to Japanese Application No. 2017-158899, filed Aug. 21, 2017. The entire contents of all of the above applications are incorporated herein by reference.

BACKGROUND OF THE INVENTION

Field of the Invention

The present invention relates to a method for evaluating the anticancer effect of anticancer drugs in the presence of immune cells in a more reliable manner, which is performed in in vitro systems without using animal models, and a method for predicting effectiveness of cancer immunotherapy using the evaluation method.

Discussion of the Background

For selection of suitable anticancer drugs, in the development of anticancer drugs or in cancer therapy, the effects of anticancer drugs on cancer cells are evaluated in in vitro assay systems. Such in vitro assay systems are also used for new drug development. The drug approval rate is quite low, and, for example, 0.1% in Japanese pharmaceutical companies. In order to increase the success rate of drug approval, it is necessary to make an early decision on the probability of whether drug candidate substances have desired drug efficacy. Accordingly, methods for evaluating the drug efficacy with high reliability have been required. In particular, restrictions on conventional animal models are considered to be one of the reasons that hinder the successful development of new drugs in pharmaceutical companies. Pharmaceutical companies have required drug evaluation models that reproduce environments closer to the in vivo environment, in place of animal models.

However, in the conventional methods for evaluating anticancer drugs in in vitro systems, drug candidate substances that are able to exhibit superior anticancer activity when administered into the living body may be evaluated as having poor performance. On the other hand, even drug candidate substances that do not exhibit sufficient anticancer effect when administered into the living body may be evaluated as having good performance in conventional in vitro assay systems. Thus, there is a problem that the evaluation in the assay systems is not always linked to actual clinical effects. Due to the low correlation between the evaluation obtained in the conventional in vitro assay systems and the drug efficacy obtained when actually administered in the living body, conventional in vitro evaluation methods may fail to select anticancer drugs suitable for cancer therapy, and fail to improve cancer therapy results.

In recent years, cancer immunotherapy has attracted attention in cancer treatment methods. Since immune checkpoint inhibitors such as anti-PD-1 antibody used in immunotherapy are difficult to evaluate in animal models, there is a strong demand for effective in vitro assay systems. Recently, immunotherapy evaluation using animal models, in which PDX (patient derived xenograft) is transplanted to humanized laboratory animals, has been reported. However, since it is difficult to completely humanize the immune system, the evaluation is performed in animal bodies having a biological system different from that of humans. Moreover, the success rate of tumor engraftment varies depending on the types of tumor (25 to 75%), and it takes time to establish PDX. In addition, subculture is required to achieve cancerization in a stable manner. Therefore, it is difficult to perform immunotherapy evaluation using PDX for drug efficacy evaluation for drug candidate substances at an early stage of development, and more useful in vitro assay systems are required.

As an example of an anticancer drug evaluation method performed in in vitro systems, PTL 1 discloses a method for performing anticancer evaluation of drugs by culturing cancer cells coexisting with immune cells in a droplet of collagen gel. This method uses the method disclosed in PTL 2, in which the stroma around cancer cells is actively removed, and the cancer cells are propagated as a cell mass of only cancer cells.

However, data analysis of colorectal cancer patients has recently clarified the possibility that many genes that are highly expressed in patients with poor outcome are expressed in a stroma. Moreover, this possibility was investigated using data obtained from mice transplanted with human cancer cells, and it was found that genes highly expressed in mice transplanted with cells from patients with poor outcome were not derived from the human cancer tissue, but were derived from the mouse tissue surrounding the human cancer tissues (NPL 1). In particular, it is reported that abnormally activated special fibroblasts often appear in highly malignant cancer. They are called "cancer-associated fibroblasts (CAF)." CAF reportedly promotes angiogenesis, and growth and infiltration of cancer cells, etc. (NPL 2). Accordingly, in the cancer microenvironment (cancer cells and their surrounding environment in the body), the stroma greatly affects cancer cells. It is considered that an environment closer to the in vivo environment can be produced by allowing the stroma to coexist with the cancer cells.

In the United States, for example, a method for clinically examining expression of a protein (PD-L1) with regard to a mechanism of action of nivolumab, which is an anti-PD-1 monoclonal antibody drug, has been performed as the anticancer drug evaluation method performed in in vitro systems.

Nivolumab is a representative therapeutic agent for cancer immunotherapy. The above method enables prediction, to some extent, of the effect obtained when the anti-PD-1 monoclonal antibody drug is administered. However, the effectiveness rate is 20%, which is not sufficient for a drug efficacy evaluation.

PTL 1: JP 4866162 B
PTL 2: JP 3594978 B
NPL 1: Isella, et al., Nature Genetics, 2015, vol. 47, pp. 312-319
NPL 2: Shimoda, et al., Seminars in Cell & Developmental Biology, 2010, vol. 21(1), pp. 19-25
NPL 3: Brambilla et al., JOURNAL OF CLINICAL ONCOLOGY, 2016, vol. 34(11), pp. 1223-1230
NPL 4: Nishiguchi et al., Macromol Bioscience, 2015, vol. 15(3), pp. 312-317
NPL 5: Sanmamed et al., Cancer Research, 2015, vol. 75(17), pp. 3466-3478

NPL 6: Le et al., The New England Journal of Medicine, 2015, vol. 372(26), pp. 2509-2520

SUMMARY OF THE INVENTION

According to an aspect of the present invention, a method for testing an anticancer effect includes culturing a cell structure including cancer cells and stromal cells in a presence of an anticancer drug and immune cells, and measuring the number of living cancer cells in the cell structure after the culturing, as an indicator of an anticancer effect of the anticancer drug or the immune cells.

According to another aspect of the present invention, a method for testing effectiveness of cancer immunotherapy includes culturing a cell structure having a cell layer including cancer cells in a presence of an anticancer drug and immune cells, and measuring the number of living cancer cells in the cell structure after the culturing, as an indicator of effectiveness of cancer immunotherapy that uses at least one of the cancer cells and the immune cells. The cell structure includes at least one type of stromal cells, and at least one of the cancer cells and the immune cells is from a cancer patient.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A shows a cross-sectional image of a cell structure in which a cancer cell layer is seeded on the top surface, FIG. 2B shows a cross-sectional image of a cell structure in which a cancer cell layer is seeded in the 10th layer from the top surface, and FIG. 2C shows a cross-sectional image of a cell structure in which a cancer cell layer is seeded in the 20th layer from the top surface.

DESCRIPTION OF THE EMBODIMENTS

Figure 1:
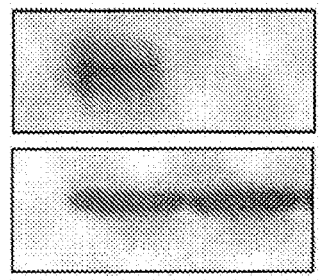
FIG. 1 shows a comparison result of PD-L1 expression level by Western blotting, as a confirmation test in Example 2, between NCI-H1975, which is a human non-small cell lung cancer cell line with high PD-L1 protein expression level, and A549, which is an alveolar basal epithelial adenocarcinoma cell line with low PD-L1 protein expression level.

The embodiments will now be described with reference to the accompanying drawings, wherein like reference numerals designate corresponding or identical elements throughout the various drawings.

A method for evaluating anticancer effect according to an embodiment of the present invention (hereinafter, also referred to as an "evaluation method according to an embodiment of the present invention") includes a culture step of culturing a cell structure containing cancer cells and cells (other than immune cells) that constitute a stroma in the presence of immune cells and an anticancer drug, and an evaluating step of evaluating the anticancer effect of the anticancer drug or the immune cells using, as an indicator, the number of living cancer cells in the cell structure after the culture step. The evaluation method according to the present embodiment evaluates the anticancer effect of the anticancer drug in the presence of immune cells by using a cell structure containing cancer cells in a three-dimensional structure, which is formed from cells that constitute a stroma, the cells constituting a stroma being other than immune cells. Both the stroma and immune cells are important components in an in vivo cancer microenvironment. The in vivo cancer cell environment can be reproduced by incorporating cancer cells into a cell structure, having a three-dimensional structure formed from cells that constitute a stroma, and further including immune cells. Thus, since evaluation is performed in an environment including an immune system as with the actual cancer cell environment in the living body, the anticancer effect can be appropriately evaluated, taking into consideration the influence of the immune system in the living body. That is, the evaluation method according to the present embodiment enables, even in an in vitro evaluation system, the evaluation of anticancer effect more accurately reflecting the clinical results of animal models or humans, and highly reliable evaluation can be obtained.

<Cell Structure>

In the present embodiment and the present specification, a "cell structure" is a three-dimensional structure in which multiple cell layers are laminated. The "cell layers" refer to layers, in a cross-sectional image of a section of the cell structure, which is observed at a magnification at which a cell nucleus can be recognized, that is, at which the entire thickness of the stained section is included in the field of view, composed of a group of cells and stroma that are present in a direction perpendicular to the thickness direction with the cell nuclei not overlapping each other in the thickness direction. In addition, "layered" means that two or more different cell layers are stacked in the thickness direction. The cell structure used in the present embodiment (hereinafter, also referred to as "the cell structure according to the present embodiment") includes cells other than immune cells among the cells constituting the stroma as well as cancer cells. Further, unless otherwise specified, the "cells other than immune cells among the cells constituting the stroma" are hereinafter referred to as "stromal cells."

The cells including stromal cells and cancer cells that constitute the cell structure according to the present embodiment are not specifically limited. The cells may be cells obtained from animals, cells obtained by culturing cells obtained from animals, cells obtained by applying various treatments to cells obtained from animals, or cultured cell lines. In the case of cells obtained from animals, the sampling site is not specifically limited. The cells may be somatic cells derived from bone, muscle, viscus, nerve, brain, bone, skin, blood, etc., reproductive cells, or embryonic stem cells (ES cells). Further, the organism species from which the cells constituting the cell structure according to the present embodiment are derived is not specifically limited. The cells can be derived from humans or animals such as monkeys, dogs, cats, rabbits, pigs, cows, mice, and rats. The cells obtained by culturing cells obtained from animals may be primary cultured cells or subcultured cells. Further, the cells obtained by applying various treatments may include induced pluripotent stem cells (iPS cells) or cells after differentiation induction. The cell structure according to the present embodiment may be composed of only cells derived from the same organism species, or cells derived from several types of organism species.

Examples of the stroma cells include endothelial cells, fibroblast cells, neuronal cells, mast cells, epithelial cells, myocardial cells, hepatic cells, pancreatic islet cells, tissue stem cells, and smooth muscle cells. The type of stroma cells contained in the cell structure according to the present embodiment may be one, or may be two or more. The cell type of stromal cells contained in the cell structure according to the present embodiment is not specifically limited, and can be suitably selected in consideration of the origin and type of cancer cells to be contained, the type of immune cells used for evaluation, the type of anticancer drug used for evaluation, the in vivo environment in which the target anticancer activity is to be exhibited, etc.

A blood vessel network structure and a lymphatic network structure are important for the growth and activity of cancer cells. Therefore, the cell structure according to the present embodiment preferably includes a vascular network structure. Namely, the cell structure according to the present embodiment is preferably one in which a vascular network structure such as of lymphatic vessels and/or blood vessels is three-dimensionally formed inside a laminate of non-vascularized cells to form tissues closer in structure to those in vivo. The vascular network structure may be formed only on the inside of the cell structure, or may be formed so that at least part thereof is exposed on the front surface or the bottom surface of the cell structure. In the present embodiment and the present specification, the term "vascular network structure" refers to a network structure, such as a blood vessel network or a lymphatic vessel network, in living tissues.

A vascular network structure can be formed by incorporating endothelial cells, which constitute vessels, as stromal cells. The endothelial cells contained in the cell structure according to the present embodiment may be vascular endothelial cells or lymphatic endothelial cells. Moreover, both vascular endothelial cells and lymphatic endothelial cells may be contained.

When the cell structure according to the present embodiment includes a vascular network structure, the cells other than the endothelial cells in the cell structure are preferably cells that constitute surrounding tissues of vessels in a living body, since the endothelial cells can easily form a vessel network maintaining the original function and shape. In order to further mimic the in vivo cancer microenvironment, the cells other than the endothelial cells are more preferably cells containing at least fibroblasts, and even more preferably cells containing vascular endothelial cells and fibroblasts, cells containing lymphatic endothelial cells and fibroblasts, or cells containing vascular endothelial cells, lymphatic endothelial cells, and fibroblasts. Further, the cells other than endothelial cells contained in the cell structure may be derived from the same species as that of the endothelial cells, or from different species.

The number of endothelial cells in the cell structure according to the present embodiment is not specifically limited as long as it is sufficient for forming a vascular network structure, and can be determined as appropriate in consideration of the size of the cell structure, the types of endothelial cells and cells other than endothelial cells, and the like. For example, a cell structure having a vascular network structure can be prepared by setting the abundance ratio (cell number ratio) of endothelial cells to all the cells constituting the cell structure according to the present embodiment to 0.1% or more. When fibroblasts are used as the cells other than endothelial cells, the number of endothelial cells in the cell structure according to the present embodiment is preferably 0.1% or more, and more preferably 0.1% to 5.0% of the number of fibroblasts. When both vascular endothelial cells and lymphatic endothelial cells are contained as endothelial cells, the total number of vascular endothelial cells and lymphatic endothelial cells is preferably 0.1% or more, and more preferably 0.1% to 5.0% of the number of fibroblasts.

The cell structure according to the present embodiment further includes cancer cells. The number of types of cancer cells contained in the cell structure according to the present embodiment may be one, or may be two or more. Further, the cancer cells refer to cells that have been derived from somatic cells and acquired infinite proliferation potential. The cancer cells contained in the cell structure according to the present embodiment may be established culture cells, or cancer cells obtained from a cancer patient. The cancer cells obtained from a cancer patient may be previously grown by culture. Specifically, examples of the cancer cells include primary cancer cells obtained from a cancer patient, artificially cultured cancer cells, iPS cancer stem cells, cancer stem cells, and established cancer cells previously prepared for use in studies of cancer therapy and development of anticancer drugs. Moreover, the cancer cells may be derived from a human, or may be derived from an animal other than a human. When the cell structure according to the present embodiment contains cancer cells obtained from a cancer patient, it can also contain cells other than the cancer cells obtained from the cancer patient together with the cancer cells. Examples of the cells other than cancer cells include one or more types of cells contained in solid tissue removed after surgery.

Non-limiting examples of the cancer from which cancer cells are derived to be included in the cell structure according to the present embodiment include breast cancer (e.g., invasive ductal carcinoma, ductal carcinoma in situ, and inflammatory breast cancer), prostate cancer (e.g., hormone-dependent prostate cancer and hormone-independent prostate cancer), pancreatic cancer (e.g., pancreatic duct cancer), gastric cancer (e.g., papillary adenocarcinoma, mucinous adenocarcinoma, and adenosquamous carcinoma), lung cancer (e.g., non-small-cell lung cancer, small-cell lung cancer, and malignant mesothelioma), colon cancer (e.g., gastrointestinal stromal tumor), rectal cancer (e.g., gastrointestinal stromal tumor), colorectal cancer (e.g., familial colorectal cancer, hereditary nonpolyposis colorectal cancer, and gastrointestinal stromal tumor), small intestinal cancer (e.g., non-Hodgkin's lymphoma and gastrointestinal stromal tumor), esophageal cancer, duodenal cancer, tongue cancer, pharyngeal cancer (e.g., nasopharyngeal cancer, oropharyngeal cancer, and hypopharyngeal cancer), head and neck cancer, salivary gland cancer, brain tumor (e.g., pineal astrocytoma, pilocytic astrocytoma, diffuse astrocytoma, and anaplastic astrocytoma), neurilemmoma, liver cancer (e.g., primary liver cancer and extrahepatic bile duct cancer), renal cancer (e.g., renal cell cancer and transitional cell cancer of the renal pelvis and ureter), gallbladder cancer, bile duct cancer, pancreatic cancer, hepatoma, endometrial cancer, cervical cancer, ovarian cancer (e.g., epithelial ovarian cancer, extragonadal germ cell tumor, ovarian germ cell tumor, and ovarian low-malignant potential tumor), bladder cancer, urethral cancer, skin cancer (e.g., intraocular (ocular) melanoma and Merkel cell carcinoma), hemangioma, malignant lymphoma (e.g., reticulosarcoma, lymphosarcoma, and Hodgkin's disease), melanoma (malignant melanoma), thyroid cancer (e.g., medullary thyroid cancer), parathyroid cancer, nasal cancer, paranasal cancer, bone tumor (e.g., osteosarcoma, Ewing's tumor, uterine sarcoma, and soft-tissue sarcoma), metastatic medulloblastoma, hemangiofibroma, dermatofibrosarcoma protuberans, retinal sarcoma, penile cancer, testicular tumor, pediatric solid cancer (e.g., Wilms tumor and pediatric renal tumor), Kaposi sarcoma, Kaposi sarcoma caused by AIDS, tumor of the maxillary sinus, fibrous histiocytoma, leiomyosarcoma, rhabdomyosarcoma, chronic myeloproliferative disorders, leukemia (e.g., acute myelogenous leukemia and acute lymphoblastic leukemia), and the like.

The number of cancer cells in the cell structure according to the present embodiment is not specifically limited. However, in order to further mimic the in vivo cancer microenvironment, the ratio of the number of endothelial cells to the number of cancer cells ([number of endothelial cells]/[number of cancer cells]) in the cell structure is preferably more than 0 and 1.5 or less. Moreover, when a cell structure containing endothelial cells, fibroblasts, and cancer cells is used, the ratio of the number of fibroblasts to the number of cancer cells ([number of fibroblasts]/[number of cancer cells]) in the cell structure is preferably in the range of 0.6 to 100, and more preferably in the range of 50 to 100.

The cell structure according to the present embodiment may be a cell structure in which cancer cells are scattered in the entire structure, or a cell structure in which cancer cells are present only in a limited cell layer. When cancer cells are present only in a limited cell layer in the cell structure according to the present embodiment, the cell layer containing the cancer cells (cancer cell layer) may be located at any position in the cell structure. The position of the cancer cell layer in the thickness direction of the cell structure may be within the range from the top surface (upper surface) of the structure to the middle of the thickness so that the effect of immune cells and/or anticancer drug can sufficiently reach it. In particular, when the cell structure is cultured in the presence of immune cells, the cancer cell layer can be placed inside the cell structure rather than at the top surface of the cell structure to thereby evaluate the anticancer effect including the ability of the immune cells to invade and reach the cancer cells in the cell structure. Further, in the present specification, the thickness of the cell structure refers to the length of the tissue in a self-weight direction. The self-weight direction refers to a direction in which the gravity is exerted, and corresponds to a thickness direction.

The cell structure according to the present embodiment may also include cells other than the cancer cells and stromal cells. Examples of such cells include immune cells, neuronal cells, hepatic cells, pancreatic cells, myocardial cells, smooth muscle cells, bone cells, alveolar epithelial cells, and spleen cells.

The size and shape of the cell structure according to the present embodiment are not specifically limited. In order to form a vascular network structure in a state closer to vessels in the in vivo tissue and to obtain more highly accurate evaluation, the cell structure preferably has a thickness of 5 μm or more, more preferably 10 μm or more, even more preferably 50 μm or more, and still more preferably 100 μm or more. The thickness of the cell structure is preferably 500 μm or less, more preferably 400 μm or less, and even more preferably 300 μm or less. The number of cell layers in the cell structure according to the present embodiment is preferably approximately in the range of 2 to 60, more preferably approximately in the range of 5 to 60, and even more preferably approximately in the range of 10 to 60.

The number of cell layers that constitute the cell structure is measured by dividing the total number of cells that constitute a three-dimensional structure by the number of cells per layer (the number of cells necessary to form one layer). The number of cells per layer can be examined in such a manner that cells are previously cultured on a plane so that they are confluent in a cell culture vessel that is used in the production of a cell structure. Specifically, the number of cell layers in a cell structure formed in a certain cell culture vessel can be calculated by counting the total number of cells that constitute the cell structure, and dividing the total number of cells by the number of cells per layer in the cell culture vessel.

In general, the cell structure according to the present embodiment is produced in a cell culture vessel. The cell culture vessel is not specifically limited as long as it enables the production of a cell structure, and culture of the produced cell structure. Specifically, examples of the cell culture vessel include dishes, cell culture inserts (e.g., Transwell (registered trademark) inserts, Netwell (registered trademark) inserts, Falcon (registered trademark) cell culture inserts, and Millicell (registered trademark) cell culture inserts), tubes, flasks, bottles, plates, and the like. In the production of the cell structure according to the present embodiment, dishes or various cell culture inserts are preferable, because they can more appropriately allow evaluation using the cell structure.

The cell structure according to the present embodiment may be a structure formed from multi-layered cell layer containing cancer cells and stromal cells, and the method for producing the cell structure is not limited. For example, the method may be one forming layers one by one and laminating them in sequence, or may be one concurrently forming two or more cell layers, or may be one forming a multi-layered cell layer by appropriately combining both of the former methods. Further, the cell structure of the present embodiment may be a multi-layered structure in which the cell types constituting the respective cell layers are different between the layers, or may be a cell structure in which the cell types constituting the respective cell layers are common to all the layers of the structure. For example, the method may be one forming a layer for each cell type and laminating these cell layers in sequence, or may be one preparing a cell mixture solution beforehand by mixing a plurality of types of cells and forming a cell structure having a multi-layered structure from the cell mixture solution, which is previously prepared by mixing a plurality of types of cells.

An example of the method of producing the cell structure by laminating each layer in sequence includes the method disclosed in JP 4919464 B, that is, repeating alternately a step of forming a cell layer and a step of bringing the formed cell layer into contact with a solution containing an extracellular matrix (ECM) component to laminate the cell layers in a continuous manner. For example, when this method is performed, a cell mixture containing all cells that constitute a cell structure is previously prepared, and each cell layer is formed from this cell mixture. Accordingly, a cell structure can be produced in which a vascular network structure is formed in the entire structure, and cancer cells are scattered in the entire structure. Furthermore, cell layers can also be formed for each cell type. Accordingly, a cell structure can be produced in which a vascular network structure is formed only in a layer formed from endothelial cells, and cancer cells are present only in a limited cell layer.

The method of forming two or more cell layers at once is disclosed in JP 5850419 B, for example. According to the above method, the entire cell surface is previously coated with a polymer containing an arginine-glycine-aspartic acid (RGD) sequence to which integrins bind, and a polymer interacting with the polymer containing the RGD sequence. After the cells coated with the adhesive film are placed in a cell culture vessel, the coated cells are aggregated by centrifugation or the like to thereby produce a cell structure having a multi-layered cell layer. For example, when this method is performed, the coated cells are prepared by previously preparing a cell mixture containing all cells that constitute a cell structure, and adding an adhesive component to the cell mixture. This enables the production of a cell structure in which cancer cells are scattered in the entire structure by one centrifugation. Moreover, for example, coated cells of endothelial cells, coated cells of fibroblasts, and coated cells of a cell population obtained from a cancer patient are separately prepared. Then, a laminate is formed by laminating, in sequence, a multilayer composed of the coated cells of fibroblasts, a single layer composed of the coated cells of endothelial cells, a multilayer composed of the coated cells of fibroblasts, and a single layer composed of the coated cells of the cells containing cancer cells. This enables the production of a cell structure having a vascular network structure inserted between thick fibroblast layers, and having, on a top surface thereof, a layer containing cancer cells obtained from a cancer patient.

Figure 2A:
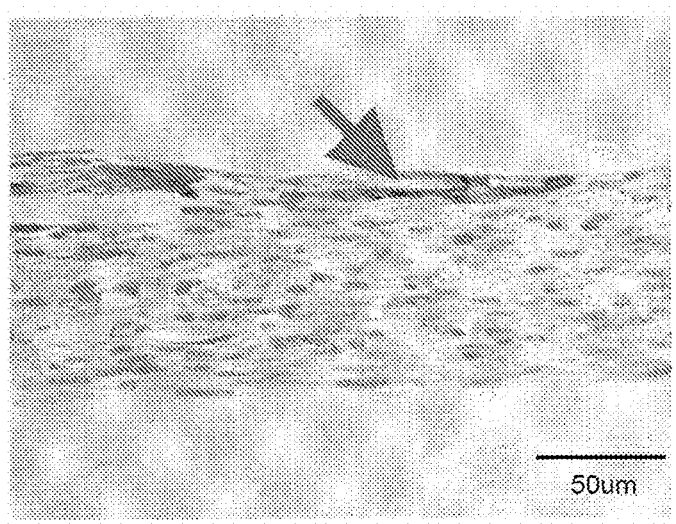
FIGS. 2A-2C correspond to a confirmation test in Example 4.
Figure 2B:
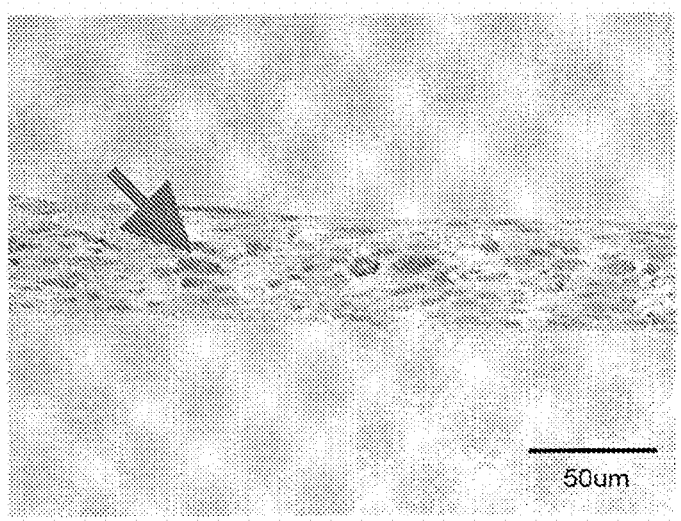
Figure 2C:
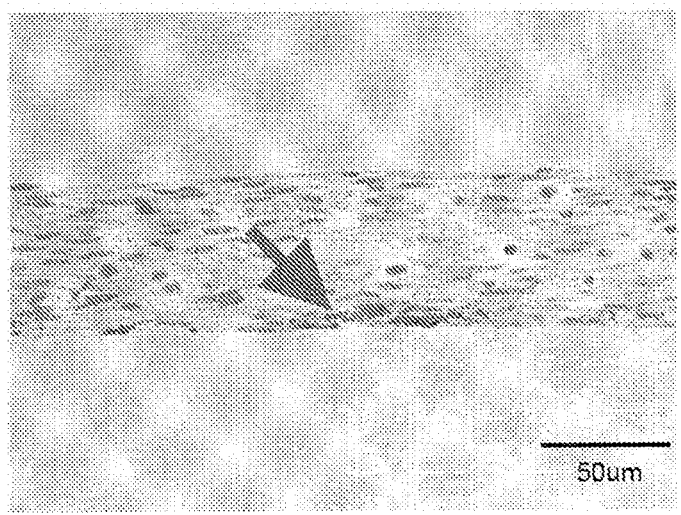

The cell structure according to the present embodiment may also be produced by a method including the following steps (a) to (c) shown in FIGS. 2A-2C: (a) shown in FIG. 2A is a step of mixing cells with an extracellular matrix component in a cationic buffer solution to obtain a mixture; (b) shown in FIG. 2B is a step of seeding the mixture obtained in step (a) in a cell culture vessel; and (c) shown in FIG. 2C is a step of obtaining a cell structure in which cells are multi-layered in the cell culture vessel after step (b).

In step (a), cells are mixed with a buffer solution containing a cationic substance (cationic buffer solution) and an extracellular matrix component to form cell aggregates from the cell mixture to thereby obtain a three-dimensional cell tissue with few large voids therein. Further, the obtained three-dimensional cell tissues, which are comparatively stable, can be cultured for at least several days, and are unlikely to be damaged during medium replacement. Further, in the present embodiment, step (b) can also include precipitating, in a cell culture vessel, the cell mixture seeded in the cell culture vessel. The cell mixture may be actively precipitated by centrifugal separation or the like, or may be spontaneously precipitated.

In step (a), the cells are preferably further mixed with a strong electrolyte polymer. When the cells are mixed with a cationic substance, a strong electrolyte polymer, and an extracellular matrix component, a thick three-dimensional cell tissue with few voids can be obtained, even when the cells are spontaneously precipitated without requiring treatment such as centrifugal separation for actively aggregating the cells in step (b).

Examples of the cationic buffer solution include tris-hydrochloric acid buffer solution, tris-maleic acid buffer solution, bis-tris buffer solution, and HEPES. The concentration and pH of the cationic substance in a cationic buffer solution (e.g., tris in a tris-hydrochloric acid buffer solution) are not specifically limited as long as they do not adversely affect the growth of the cells and production of the cell structure. For example, the concentration of the cationic substance in a cationic buffer solution may be in the range of 10 mM to 100 mM, preferably in the range of 40 mM to 70 mM, and more preferably 50 mM. The pH of a cationic buffer solution may be in the range of 6.0 to 8.0, preferably in the range of 6.8 to 7.8, and more preferably in the range of 7.2 to 7.6.

Examples of the strong electrolyte polymer include, but are not limited to, glycosaminoglycans such as heparin, chondroitin sulfate (e.g., chondroitin 4-sulfate, or chondroitin 6-sulfate), heparan sulfate, dermatan sulfate, keratan sulfate, hyaluronic acid, and the like; dextran sulfate, rhamnan sulfate, fucoidan, carrageenan, polystyrene sulfonic acid, polyacrylamide-2-methylpropanesulfonic acid, polyacrylic acid, and derivatives thereof. The mixture prepared in step (a) may be mixed with only one strong electrolyte polymer, or two or more strong electrolyte polymers in combination. In the formation of the cell structure according to the present embodiment, the strong electrolyte polymer is preferably a glycosaminoglycan. Further, at least one from among heparin, dextran sulfate, chondroitin sulfate, and dermatan sulfate may more preferably be used. The strong electrolyte polymer for use in the present embodiment is further preferably heparin. The amount of the strong electrolyte polymer mixed in the cationic buffer solution is not specifically limited unless it adversely affects the growth of the cells and the production of the cell structure.

For example, the concentration of the strong electrolyte polymer in the cationic buffer solution may be in the range of higher than 0 mg/mL and lower than 1.0 mg/mL, preferably in the range of 0.025 mg/mL to 0.1 mg/mL, and more preferably in the range of 0.05 mg/mL to 0.1 mg/mL. Moreover, in the present embodiment, a cell structure can be produced by preparing the above mixture without mixing in a strong electrolyte polymer mentioned above.

Examples of the extracellular matrix component include collagen, laminin, fibronectin, vitronectin, elastin, tenascin, entactin, fibrillin, proteoglycan, and modifications or variants thereof. Examples of the proteoglycan include chondroitin sulfate proteoglycan, heparan sulfate proteoglycan, keratan sulfate proteoglycan, and dermatan sulfate proteoglycan. The mixture prepared in step (a) may be mixed with only one extracellular matrix component, or two or more extracellular matrix components in combination. In the production of the cell structure according to the present embodiment, it is preferable to use collagen, laminin, or fibronectin, and it is more preferable to use collagen. Modified forms and variants of the extracellular matrix components mentioned above may also be used, as long as they do not adversely affect the cell growth and the production of cell structure. The amount of extracellular matrix component mixed in the cationic buffer solution is not specifically limited, as long as it does not adversely affect the cell growth and the production of the cell structure. For example, the concentration of the extracellular matrix component in the cationic buffer solution may be in the range of higher than 0 mg/mL and lower than 1.0 mg/mL, preferably in the range of 0.025 mg/mL to 0.1 mg/mL, and more preferably in the range of 0.05 mg/mL to 0.1 mg/mL.

The mixing ratio of the strong electrolyte polymer to the extracellular matrix component in the cationic buffer solution is in the range of 1:2 to 2:1. In the production of the cell structure according to the present embodiment, the mixing ratio of the strong electrolyte polymer to the extracellular matrix component is preferably in the range of 1:1.5 to 1.5:1, and more preferably 1:1.

Steps (a) to (c) described above are repeatedly performed to form a sufficiently thick cell structure. In the repetition, on the cell structure obtained in a previous iteration of step (c), the mixture prepared in step (a) is seeded, as step (b), followed by step (c) of this iteration. The cell composition of the mixture newly seeded in the cell structure obtained in step (c) may be the same as or different from the cell composition that constitute the already produced cell structure.

For example, step (a) is first performed to prepare a mixture containing only fibroblasts as cells, and then steps (b) and (c) are performed to obtain a cell structure formed from 10 fibroblast layers in a cell culture vessel. Subsequently, step (a) is performed to prepare a mixture containing only vascular endothelial cells as cells, and then steps (b) and (c) are performed to laminate one vascular endothelial cell layer on the fibroblast layers in the cell culture vessel. Further, step (a) is performed to prepare a mixture containing only fibroblasts as cells, and then steps (b) and (c) are performed to laminate 10 fibroblast layers on the vascular endothelial cell layer in the cell culture vessel. In addition, step (a) is performed to prepare a mixture containing cancer cells obtained from a cancer patient, and then steps (b) and (c) are performed to laminate one cancer cell layer on the fibroblast layers in the cell culture vessel. This enables the production of a cell structure in which 10 fibroblast layers, one vascular endothelial cell layer, 10 fibroblast layers, and one cancer cell layer are sequentially laminated in layers for each cell type. The thickness of cell layers laminated in step (c) can be adjusted by controlling the number of cells seeded in step (b). The number of cell layers laminated in step (c) increases as a larger number of cells is seeded in step (b). Moreover, step (a) is performed to prepare a mixture containing all the fibroblasts for 20 fibroblast layers and all the vascular endothelial cells for one vascular endothelial cell layer, and then steps (b) and (c) are performed to laminate a mixture containing cancer cells obtained from a cancer patient prepared in the same manner as described above on the formed multi-layered structure to thereby produce a cell structure having a thickness corresponding to the 21 layers, in which a cancer cell layer is laminated on the structure having a vascular network structure scattered therein. Furthermore, step (a) is performed to prepare a mixture containing all the fibroblasts for 20 fibroblast layers, all the vascular endothelial cells for one vascular endothelial cell layer, and all the cells derived from a cancer patient for one cancer cell layer, and then steps (b) and (c) are performed to thereby produce a cell structure having a thickness corresponding to the 22 layers, in which the cancer cells and a vascular network structure are both independently scattered in the structure.

When steps (a) to (c) are repeated, the obtained cell structure may be cultured after step (c) and before step (b). Culturing conditions, such as composition of the culture medium used in the culture, culturing temperature, culturing time, and atmospheric composition during culture, are determined so as to be suitable for culture of the cells forming the cell structure. Examples of the culture medium include D-MEM, E-MEM, MEMa, RPMI-1640, Ham's F-12, and the like.

After step (a), the following steps (a'-1) and (a'-2) may be performed, and then step (b) may be performed: (a'-1) a step of removing a liquid part from the obtained mixture, and obtaining cell aggregates, and (a'-2) a step of suspending the cell aggregates in a solution. Desired tissues can be obtained by performing steps (a) to (c) described above, but more homogenous tissues can be obtained by performing steps (a), (a'-1), (a'-2) and (b) in this order.

Alternatively, step (a) may be followed by steps (b'-1) and (b'-2) described below in place of step (b). More homogenous tissues can also be obtained by performing steps (b'-1) and (b'-2). Step (b'-2), as with step (b), can also include precipitating, in a cell culture vessel, the cell mixture seeded in the cell culture vessel. The cell mixture may be actively precipitated by centrifugal separation or the like, or may be spontaneously precipitated. In the present embodiment and the present specification, the term "cell viscous body" refers to gel-like cell aggregates as described in NPL 4.

(b'-1) a step of seeding the mixture obtained in step (a) in a cell culture vessel, and then removing a liquid component from the mixture to obtain a cell viscous body; and (b'-2) a step of suspending the cell viscous body in a solvent in the cell culture vessel.

The solvent for preparing a cell suspension is not particularly limited unless it is toxic to the cells or unless it impairs the growth and functions of the cells. Thus, the cell suspension may be water, a buffer solution, a cell culture medium, or the like. Examples of the buffer solution include phosphate buffered saline (PBS), HEPES, Hanks buffer solution, and the like. Examples of culture medium include D-MEM, E-MEM, MEMa, RPMI-1640, Ham's F-12, and the like. When cell culture medium is used as a solvent for preparing the cell suspension, the cells can be cultured without removing the liquid component in step (c) described below.

The following step (c') may be performed in place of step (c).

(c'): a step of forming a cell layer on the substrate.

In steps (c) and (c'), the liquid component can be removed from seeded mixture. The method of removing the liquid component in steps (c) and (c') is not limited, as long as it does not adversely affect the cell growth and the production of the cell structure. The method of removing a liquid component from a suspension of the liquid component and a solid component can be suitably performed by a method known to a person skilled in the art. Examples of the method include suction, centrifugal separation, magnetic separation, filtration, and the like. For example, when a cell culture insert is used as the cell culture vessel, the cell culture insert in which the mixture is seeded can be subjected to centrifugal separation at 10° C. at 400×g for 1 minute to precipitate the cell mixture, and then remove the liquid component by suction.

<Anticancer Drug>

The anticancer drugs used in the evaluation method according to the present embodiment may be drugs used for cancer therapy, and include not only drugs that directly act on cancer cells, such as drugs having cytotoxicity, but also drugs that do not have cytotoxicity but suppress the growth of cancer cells, etc. Examples of anticancer drugs that do not have cytotoxicity include: drugs that do not directly attack cancer cells, but exhibit the function to suppress the growth of cancer cells, blunt the activity of cancer cells, or kill cancer cells, by the cooperative action with in vivo immune cells or other drugs; and drugs that suppress the growth of cancer cells by impairing cells, other than cancer cells, and tissue. The anticancer drugs used in the present embodiment may be known drugs having anticancer activity, or candidate compounds for novel anticancer drugs.

Examples of the anticancer drugs having cytotoxicity include, but are not limited to, molecular targeted drugs, alkylating agents, antimetabolites represented by 5-FU-based anticancer drugs, plant alkaloids, anticancer antibiotics, platinum derivatives, hormonal agents, topoisomerase inhibitors, microtubule inhibitors, and compounds classified into biological response modifiers.

Examples of the anticancer drugs not having cytotoxicity include, but are not limited to, angiogenesis inhibitors, prodrugs of anticancer drugs, drugs that regulate intracellular metabolism enzyme activity associated with the metabolism of anticancer drugs or prodrugs thereof (hereinafter referred to as "intracellular enzyme regulators" in the specification), immunotherapy agents, and the like. Other examples include drugs that are finally involved in anticancer activity by increasing the function of anticancer drugs or improving the in vivo immune function.

The angiogenesis inhibitors may be compounds that are expected to have angiogenesis inhibitory activity, and may be known angiogenesis inhibitors or candidate compounds for novel angiogenesis inhibitors. Examples of known angiogenesis inhibitors include Avastin, EYLEA, Suchibaga, CYRAMZA (registered trademark) (also known as ramucirumab, produced by Eli Lilly), BMS-275291 (produced by Bristol-Myers), Celecoxib (produced by Pharmacia/Pfizer), EMD121974 (produced by Merck), Endostatin (produced by EntreMed), Erbitaux (produced by ImClone Systems), Interferon-α (produced by Roche), LY317615 (produced by Eli Lilly), Neovastat (produced by Aeterna Laboratories), PTK787 (produced by Abbott), SU6688 (produced by Sugen), Thalidomide (produced by Celgene), VEGF-Trap (produced by Regeneron), Iressa (registered trademark) (also known as gefitinib, produced by AstraZeneca), Caplerusa (registered trademark) (also known as vandetanib, produced by AstraZeneca), Recentin (registered trademark) (also known as cediranib, produced by Astra-Zeneca), VGX-100 (produced by Circadian Technologies), VD1 and cVE199, VGX-300 (produced by Circadian Technologies), sVEGFR2, hF4-3C5, Nexavar (registered trademark) (also known as sorafenib, produced by Bayer Yakuhin), Vortrient (registered trademark) (also known as pazopanib, produced by GlaxoSmithKline), Sutent (registered trademark) (also known as sunitinib, produced by Pfizer), Inlyta (registered trademark) (also known as axitinib, produced by Pfizer), CEP-11981 (produced by Teva Pharmaceutical Industries), AMG-386 (also known as trebananib, produced by Takeda Yakuhin), anti-NRP2B (produced by Genentech), Ofev (registered trademark) (also known as nintedanib, produced by Boehringer Ingelheim), AMG706 (also known as motesanib, produced by Takeda Yakuhin), and the like.

Prodrugs of anticancer drugs are drugs that are converted into active substances having anticancer activity by organs such as the liver, and intracellular enzymes of cancer cells. Cytokine networks enhance enzyme activity of the intracellular enzymes to thereby increase the amount of active substances, and result in the enhancement of antitumor effects; thus, these prodrugs are exemplified as drugs involved in anticancer activity.

Examples of intracellular enzyme regulators include gimeracil, which does not have a direct antitumor effect when used alone, but is involved in anticancer activity by inhibiting an enzyme (dihydropyrimidine dehydrogenase: DPD) which degrades 5-FU-based anticancer drugs.

Immunotherapy agents are drugs that obtain an anticancer effect by activating immune functions or motility of immune cells to thereby improve immune functions. Examples of the immunotherapy agents include drugs used for biological response modifier therapy (hereinafter, abbreviated as "BRM preparations"), cytokine preparations formed from cytokines, which are secreted from immune cells and involved in migration and invasion, cancer immune checkpoint inhibitors that have attracted attention in recent years, cancer vaccines, and cancer viruses. Examples of the BRM preparations include Krestin, Lentinan, and OK-432. Examples of the cytokine preparations include interleukins such as IL-8 and IL-2; interferons such as IFN-α, IFN-β, and IFN-γ; and chemokines such as CCL3, CCL4, CCL5, CXCL9, CXCL10, CXCL11, CXCL16/CXCR6, and CX3CL1/CX3CR1.

The cancer immune checkpoint inhibitors are substances that specifically inhibit a function of proteins which are present on the surface of cancer cells or immune cells and involved in reduction of immune function against cancer cells. Examples of such proteins include PD-1, PD-L1, PD-L2, CD4, CD8, CD19, CD28, CD80/86, B7, Galectin-9, HVEM, CTLA-4, TIM-3, BTLA, MHC-II, LAG-3, and TCR. The cancer immune checkpoint inhibitors are preferably specific monoclonal antibody drugs targeting these proteins. Specific examples of the cancer immune checkpoint inhibitors include nivolumab (Opdivo), pembrolizumab (Keytruda), atezolizumab (Tecentriq), ipilimumab (Yervoy), tremelimumab, durvalmab, and avelumab.

Among the evaluation methods according to the present embodiment, in which a cell structure containing the cancer cells is cultured in the presence of immune cells and an anticancer drug, the anticancer drug used is preferably an immunotherapeutic agent, and more preferably a cancer immune checkpoint inhibitor since the effectiveness seems to be largely affected by the immune function.

In the evaluation method according to the present embodiment, one anticancer drug may be used, or two or more anticancer drugs may be used in combination. Furthermore, one or more anticancer drugs may be used in combination with drugs other than anticancer drugs. For example, when an anticancer drug that exhibits an anticancer effect when used alone is administered in combination with other drugs in actual clinical practice, the evaluation method according to the present embodiment may be performed using the anticancer drug in combination with the other drugs.

<Immune Cells>

Immune cells are cells involved in immunity. Specific examples of the immune cells include lymphocytes, macrophages, and dendritic cells. Lymphocytes include T cells, B cells, NK cells, plasma cells, and the like.

The type of immune cells used in the evaluation method according to the present embodiment may be one, or may be two or more. Although any type of immune cells can be used in the present embodiment, preferable cells are ones that are present around the actual cancer microenvironment and involved in a mechanism of attacking the cancer cells by immune reaction. Specifically, in the present embodiment, immune cells preferably include at least one selected from the group consisting of leukocytes and lymphocytes, and more preferably include T cells.

In the evaluation method according to the present embodiment, PBMC (plasma peripheral blood mononuclear cells) can be used as the immune cells. The PBMC includes lymphocytes and monocytes. The monocytes include macrophages. The lymphocytes include NK cells, B cells, and T cells. In addition to PBMC, these components can be used singly or in combination. PBMC can be isolated and purified from blood, or a buffy coat prepared from blood can also be used as it is. In the buffy coat, PBMC together with other components is contained. Preparation of the buffy coat from blood can be performed by conventional methods such as centrifugal separation.

Some immune cells include a plurality of types that are slightly different in properties, like the ABO blood groups, even in the same component. In the evaluation method according to the present embodiment, any one type of immune cells may be used, or a plurality of types of immune cells may be used in combination.

The immune cells may be those obtained from a living body, cultured cell lines, or cells that are artificially altered or modified in vitro. When immune cells collected from a cancer patient are used, immune cells, particularly PBMC, isolated from the peripheral blood or a tumor of the cancer patient, are preferably used. Further, the artificially altered or modified immune cells are preferably those having an immune function artificially altered to enhance anticancer activity. Examples of such immune cells having altered immune function include modified T cells that are used for a gene-modified T cell therapy using chimeric antigen receptors (CAR), which has attracted attention in recent years.

<Culture Step>

In the evaluation method according to the present embodiment, the culture step is performed in which a cell structure containing cancer cells and stromal cells is first cultured in the presence of at least one type of immune cells and at least one type of anticancer drug. Specifically, the cell structure is cultured in a culture medium in which immune cells and the anticancer drug are mixed. The anticancer drug and the immune cells may be added simultaneously or separately to the medium in which the cell structure is cultured. When they are separately added, it is preferred to add the immune cells first, and then add the anticancer drug.

The amount of anticancer drug to be mixed in the culture medium can be experimentally determined in consideration of the conditions such as the type and number of cells constituting the cell structure, the type and amount of cancer cells contained, the type of culture medium, culture temperature, culture time, the type and amount of immune cells to coexist, and the strength of immune function. Similarly, the amount of immune cells to be mixed in the culture medium can be experimentally determined in consideration of the culture conditions, such as the type and number of cells constituting the cell structure, the type and amount of cancer cells contained, the type of culture medium, culture temperature, culture time, and the type and amount of anticancer drug used in combination. In particular, considering that the immune reaction has a strong influence on the anticancer effect, the total number of immune cells at least at the start of the culture step, when immune cells are used in the evaluation method according to the present embodiment, is preferably 0.05% or more of the total number of cells in the cell structure, and more preferably more than the number of cancer cells contained in the cell structure.

The culture time, during which the cell structure is cultured in the medium containing the immune cells and the anticancer drug, is not specifically limited, and may be, for example, 24 to 96 hours, preferably 48 to 96 hours, and more preferably 48 to 72 hours. Furthermore, hydrodynamic loads, such as reflux, may be applied, if necessary, within a range that does not greatly change the culture environment.

<Evaluating Step>

The anticancer effect of an anticancer drug in the presence of the anticancer drug and immune cells is evaluated using, as an indicator, the number of living cancer cells in the cell structure after the culture step. The anticancer effect refers to an effect of suppressing the growth of cancer cells or an effect of killing cancer cells.

Specifically, when the number of living cancer cells in the cell structure is smaller than that cultured in the absence of the anticancer drug and immune cells, at least one of the anticancer drug and the immune cells used is evaluated to have an anticancer effect on the cancer cells contained in the cell structure. Further, when the number of living cancer cells in the cell structure is smaller than that cultured in the presence of the anticancer drug alone or in the presence of the immune cells alone, combined use of the anticancer drug and the immune cells is evaluated to have a higher anticancer effect than the single use of each drug. In contrast, when the number of living cancer cells is equal to or significantly larger than that cultured in the absence of an anticancer drug and immune cells, the anticancer drug or the immune cells is evaluated to have no anticancer effect on the cancer cells contained in the cell structure.

The number of living cancer cells can be evaluated using a signal correlated with the number of living cancer cells or the abundance of living cancer cells. It is not always necessary to count cancer cells when they are all alive, but the living cancer cells at the time of evaluation may only have to be counted. For example, cancer cells are labeled so that they can be distinguished from other cells, and a signal from the label can be examined as an indicator. For example, cancer cells living in the cell structure can be directly counted by fluorescently labeling cancer cells and then determining the cell viability. In this case, an image analysis technique can also be used. The cell viability can be determined by using a well-known method such as trypan blue staining or PI (propidium iodide) staining. The fluorescent labeling of cancer cells can be performed by a known method such as immunostaining, which uses, for example, an antibody against a substance specifically expressed on the cell surface of cancer cells as a primary antibody, and a fluorescently-labeled secondary antibody capable of specifically binding to the primary antibody. The determination of cell viability and the measurement of the number of living cells may be performed using intact cell structures or in a state where the cell structure is destroyed at the single-cell level. For example, after the three-dimensional structure of the cell structure after labeling of cancer cells and dead cells is destroyed, only the number of cancer cells living at the time of evaluation may be directly counted by fluorescence activated cell sorting (FACS) or the like using the label as an indicator.

The number of living cancer cells in the cell structure can also be measured with time by labeling cancer cells living in the cell structure, and detecting a signal from the label with time. The cancer cells in the cell structure may be labeled after the cell structure is produced, or cancer cells may be previously labeled before the cell structure is produced. For example, when a cell structure containing a cell population containing cancer cells derived from a cancer patient is used, the cancer cells can be previously labeled before the cell structure is produced. Moreover, together with the cancer cells, other cells derived from the cancer patient may also be labeled in the same manner. In addition, when cancer cells that constantly express fluorescent dyes are used, the number of living cancer cells can be evaluated by measuring, with a microplate reader or the like, the fluorescence intensity of a lysate obtained by dissolving the cell structure.

Since the evaluation method according to the present embodiment uses the cell structure containing a stroma, which is similar to the peripheral tissue of the cancer cells in the actual living body, evaluation can be performed in vitro in a state closer to the in vivo environment to thereby obtain highly reliable evaluation of drug efficacy. Anticancer drugs that are evaluated to have anticancer effects by the evaluation method according to the present embodiment can be expected to exhibit sufficient anticancer effects when they are actually administered to cancer patients. Accordingly, the evaluation method according to the present embodiment can be used as an unprecedented in vitro drug evaluation tool, for example, in screening or drug-repositioning screening of anticancer drug candidate compounds in the drug design field, or in screening and determination (anticancer drug sensitivity test) of anticancer drug therapy (use of one drug or combined use of drugs) in the clinical field. In particular, anticancer drugs that are evaluated to have anticancer effects by the evaluation method according to the present embodiment performed using a cell structure containing cancer cells obtained from a cancer patient can be expected to exhibit suitable anticancer effects when they are actually administered to the cancer patient.

<Anticancer Drug Evaluation Kit>

The evaluation method according to the present embodiment can be more conveniently performed by using an anticancer drug evaluation kit, which is a kit including reagents and the like used for the evaluation method according to the present embodiment. For example, the kit can be composed of a cell structure at least containing stromal cells, and a cell culture vessel accommodating the cell structure. The cell structure included in the kit may be one containing cancer cells. However, the kit may also include a cell structure that does not contain cancer cells but contains cells constituting a stroma, and a cancer cell layer may be formed on the surface of the cell structure immediately before the evaluation method is actually performed. Furthermore, in place of the cell structure, the kit may contain cells other than cancer cells among the cells constituting the cell structure.

The kit may further contain other substances used in the evaluation method. Examples of the other substances include anticancer drugs, culture media for the cell structure, labeling substances for labeling cancer cells, cell viability test reagents, substances used in production of the cell structure (e.g., cationic buffer solutions, strong electrolyte polymers, and extracellular matrix components), and the like.

<Method for Predicting Effectiveness of Cancer Immunotherapy>

In the evaluation method according to the present embodiment, when the cell structure is cultured in the presence of immune cells and an anticancer drug, the anticancer effect exerted by the immune cells and the anticancer drug can be evaluated together with the ability of the immune cells to invade and reach the cancer cells contained in the cell structure in the environment simulating a cancer microenvironment containing the in vivo immune system. Therefore, effectiveness of cancer immunotherapy can be reliably predicted by using the above evaluation method.

Among the aforementioned cell structures according to the present embodiment, a cell structure including a cell layer containing cancer cells is used to predict effectiveness of cancer immunotherapy. Since the cancer cells are present in the cell structure, the ability of the immune cells to invade and reach the cancer cells contained in the cell structure can also be evaluated. In order to further improve the reproducibility and reliability of the evaluation, the cell structure used for prediction of effectiveness of cancer immunotherapy is preferably a cell structure in which cancer cells are present in a limited cell layer in the structure. Further, the position of the cancer cell layer in the thickness direction of the cell structure is preferably within the range from the top surface of the structure to the middle of the thickness so that the effect of immune cells and/or anticancer drug can sufficiently reach the cancer cells.

In prediction of effectiveness of cancer immunotherapy, both the anticancer drug and immune cells are used. The anticancer drug added to the medium of the cell structure for the prediction of effectiveness is an anticancer drug used for cancer immunotherapy. The anticancer drug is preferably an immunotherapeutic agent, and more preferably a cancer immune checkpoint inhibitor. Further, one anticancer drug used may be used, or two or more may be used.

In prediction of effectiveness of cancer immunotherapy, the cells obtained from a cancer patient subjected to the cancer immunotherapy are used for at least one of the immune cells and cancer cells, and preferably for both the immune cells and cancer cells. The immune cells obtained from a cancer patient are preferably immune cells isolated from a body fluid (e.g., blood or lymph) or a tumor obtained from the living body of a cancer patient, more preferably immune cells isolated from peripheral blood or a tumor obtained from a living body of a cancer patient, and still more preferably PBMC isolated from peripheral blood or a tumor of a cancer patient. Since the cancer cells and immune cells obtained from a cancer patient are used, a culture environment that is closer to the in vivo environment of the cancer patient, including the types of the immune cells described above, can be provided. Further, since the evaluation is performed in a culture environment that is closer to the in vivo environment of the cancer patient, the anticancer effect obtained when the cancer immunotherapy using the anticancer drug is actually performed for the cancer patient can be more appropriately evaluated.

In prediction of effectiveness of cancer immunotherapy, evaluation can be performed in the same manner as the aforementioned evaluation method according to the present embodiment, except for using a cell structure including a cell layer containing cancer cells, using an anticancer drug that is used for cancer immunotherapy, and using cells obtained from a cancer patient subjected to the cancer immunotherapy for at least one of the immune cells and cancer cells.

Specifically, effectiveness of cancer immunotherapy is predicted by a culture step of culturing a cell structure including a cell layer containing cancer cells in the presence of immune cells and an anticancer drug, and a prediction step of predicting effectiveness of cancer immunotherapy using, as an indicator, the number of living cancer cells in the cell structure after the culture step, in which the cancer immunotherapy is performed by using at least one of the cancer cells and the immune cells. Addition of immune cells and an anticancer drug to the culture medium of the cell structure and subsequent culture, and measurement of the number of living cancer cells in the cell structure that has been cultured can be performed in the same manner as the aforementioned evaluation method according to the present embodiment.

Effectiveness of cancer immunotherapy is predicted by comparing the level of the anticancer effect obtained by using, as an indicator, the number of living cancer cells in the cell structure that has been cultured with the anticancer effect in a control group. The control group may be obtained from an experimental group cultured in the absence of either or both of an anticancer drug and immune cells, or an experimental group which uses cancer cells or immune cells that have been confirmed to exhibit an anticancer effect in the cancer immunotherapy using the anticancer drug.

When both the cancer cells and immune cells are derived from a cancer patient, the effectiveness can be specifically predicted in the following manner. When the number of living cancer cells in the cell structure that has been cultured is smaller than that cultured in the absence of the anticancer drug and immune cells, and smaller than that cultured in the presence of the anticancer drug alone or in the presence of the immune cells alone, it is predicted that a sufficient therapeutic effect is expected by applying the cancer immunotherapy using the anticancer drug to the cancer patient. When the number of living cancer cells in the cell structure that has been cultured is equal to or significantly larger than that cultured in the absence of an anticancer drug and immune cells, it is predicted that a therapeutic effect is not expected by applying the cancer immunotherapy using the anticancer drug to the cancer patient. When the number of living cancer cells in the cell structure that has been cultured is smaller than that cultured in the absence of the anticancer drug and immune cells but is equal to or significantly larger than that cultured in the presence of the anticancer drug alone or in the presence of the immune cells alone, it is also predicted that a therapeutic effect is not expected by applying the cancer immunotherapy using the anticancer drug to the cancer patient.

In addition, when only the immune cells are derived from a cancer patient and the cancer cells are not derived from a cancer patient, the effectiveness can be specifically predicted in the following manner. The cancer cells other than cells derived from a cancer patient are not specifically limited, but are preferably the cancer cells that have been confirmed to exhibit an anticancer effect by use of the anticancer drug. When the number of living cancer cells in the cell structure that has been cultured is smaller than that cultured in the presence of the anticancer drug alone, it is predicted that there is no particular problem with the immune function of the cancer patient and that a sufficient therapeutic effect is expected by applying the cancer immunotherapy using the anticancer drug to the cancer patient.

On the other hand, when the number of living cancer cells in the cell structure that has been cultured is equal to or significantly larger than that cultured in the presence of an anticancer drug alone, it is predicted that the immune function of the cancer patient is weak and that a therapeutic effect is not expected by applying the cancer immunotherapy using the anticancer drug to the cancer patient.

In addition, when only the cancer cells are derived from a cancer patient and the immune cells are not derived from a cancer patient, the effectiveness can be specifically predicted in the following manner. The immune cells that are not derived from a cancer patient are not specifically limited, but are preferably the immune cells that have been confirmed to exhibit an anticancer effect when added and cultured alone in the cell structure used. When the number of living cancer cells in the cell structure that has been cultured is smaller than that cultured in the presence of the immune cells alone, it is predicted that sufficient treatment effect is expected by applying the cancer immunotherapy using the anticancer drug to the cancer patient since a sufficient anticancer effect is obtained by use of the anticancer drug in the cancer cells of the cancer patient. On the other hand, when the number of living cancer cells in the cell structure that has been cultured is equal to or significantly larger than that cultured in the presence of immune cells alone, it is predicted that the anticancer drug is not effective for the cancer cells of the cancer patient and that a therapeutic effect is not expected by applying the cancer immunotherapy using the anticancer drug to the cancer patient.

In prediction of effectiveness of cancer immunotherapy, it is also preferred to use two or more types of cell structures, each including a cancer cell layer located at different positions in the thickness direction of the cell structure, which are separately cultured in the presence of the immune cells and the anticancer drug. In order to make the cancer immunotherapy effective, it is important that immune cells, especially T cells, are located in the vicinity of the cancer cells (see NPL 3), and effectiveness of the cancer immunotherapy largely depends on the ability of the immune cells to invade the surrounding stroma and reach the cancer cells. By using two or more types of cell structures each including a cancer cell layer located at different positions in the thickness direction of the cell structure and comparing the number of living cancer cells in the respective cell structures that have been cultured, the ability of the immune cells to invade and reach the cancer cells can be more appropriately determined and effectiveness of the cancer immunotherapy can be predicted. Furthermore, it is also preferred to use a cell structure including a cancer cell layer on the top surface, which is cultured in the same manner as above, so that the number of living cancer cells in the cell structure that has been cultured is taken as a control group in determination of the ability of the immune cells to invade and reach the cancer cells.

<Kit for Predicting Effectiveness of Cancer Immunotherapy>

The method for predicting effectiveness of cancer immunotherapy using the evaluation method according to the present embodiment can be more conveniently performed by using a kit for predicting effectiveness of cancer immunotherapy, which is a kit including reagents and the like used for the evaluation method.

The kit can include, for example, stromal cells constituting a cell structure, substances used in production of the cell structure (e.g., cationic buffer solutions, strong electrolyte polymers, and extracellular matrix components), and a cell culture vessel used in production of the cell structure. The cell culture vessel can also be used as a culture vessel for the produced cell structure. The kit may further include cancer cells, immune cells, anticancer drugs, culture media for the cell structure, labeling substances for labeling cancer cells, cell viability test reagents, and the like.

The kit for predicting effectiveness of cancer immunotherapy by using immune cells derived from a patient preferably includes two or more types of cell structures each including a cell layer containing cancer cells located at different positions in the thickness direction of the cell structure, and cell culture vessels that individually accommodate the cell structures. These cell structures preferably include the cell layer containing cancer cells at a position within the range from the top surface to the middle of the thickness.

EXAMPLES

The present embodiment will be specifically described by way of examples, which should not be construed as limiting the embodiment thereto. In the following examples, collagen I was used as collagen unless otherwise specified.

Example 1

The effect of healthy human-derived immune cells and an anticancer drug (cancer immune checkpoint inhibitor) was evaluated by using a cell structure formed from fibroblasts, vascular endothelial cells, and cancer cells, and having a blood vessel network structure.

The cell structure containing cancer cells and a blood vessel network structure used in this example was a cell structure in which a cancer cell layer formed from human colon cancer cell line HCT116 (ATCC Number: CCL-247) was disposed on a top surface of a multilayer structure formed from two types of cells, i.e., normal human dermal fibroblasts (NHDF) (product number: CC-2509, produced by Lonza) and human umbilical vein endothelial cells (HU-VEC) (product number: CC-2517A, produced by Lonza). Further, the culture medium used was a Transwell cell culture insert (product number: #3470, produced by Corning). The culture medium used was a D-MEM (product number: 043-30085, produced by Wako Pure Chemical Industries, Ltd.) containing 10 volume % bovine serum (product number: #35-010-CV, produced by Corning) and 1 volume % penicillin/streptomycin (product number: 168-23191, produced by Wako Pure Chemical Industries, Ltd.). The healthy human-derived immune cells to be evaluated were peripheral blood mononuclear cells (PBMC) (product number: CTL-CP1, produced by CTL), and the anticancer drug used was nivolumab (product number: MAB10861, produced by R&D Systems).

<Production of Cell Structures>

First, $2\times10^6$ NHDF and $3\times10^4$ HUVEC were suspended in a tris-hydrochloric acid buffer containing heparin and collagen (0.1 mg/mL heparin, 0.1 mg/mL collagen, and 50 mM tris; pH: 7.4) to prepare a cell suspension (step (a)). The cell suspension was centrifuged at room temperature at 400×g for 1 minute to remove the supernatant, and then resuspended in an appropriate amount of medium (steps (a'-1) and (a'-2)). Then, after the cell suspension was seeded in a Transwell cell culture insert, the Transwell cell culture insert was centrifuged at room temperature at 400×g for 1 minute (step (b)). Subsequently, a suitable amount of culture medium was added to the Transwell cell culture insert, followed by culture in a $CO_2$ incubator (37° C., 5% $CO_2$) for 24 hours (step (c)).

In the Transwell cell culture insert in which a structure was formed, $2\times10^4$ cancer cells suspended in an appropriate amount of culture medium were seeded, followed by culture in a $CO_2$ incubator (37° C., 5% $CO_2$) for 96 hours. After termination of the culture, a cell structure was obtained in which a cancer cell layer was disposed on a layer that contains a blood vessel network structure. The cancer cells used were previously fluorescently labeled (product number: PKH26GL, produced by SIGMA).

<Culture in Presence of PBMC and Nivolumab>

The obtained cell structure was cultured at 37° C. with 5% $CO_2$ for 72 hours in a culture medium in which 0 or $2\times10^5$ PBMC was seeded and 0 or 2 μg of nivolumab was added per well of the Transwell cell culture insert. As a control, the cell structure was cultured in the same manner as described above, except that PBMC and nivolumab were not added (culture in the absence of the drug).

Moreover, for comparison, in place of the above cell structure, cells produced by culturing cancer cells so as to form a single layer in a general culture container (2D method) and spheroids produced by spheroid culture (spheroid method) were also cultured in the same manner in the presence of PBMC and nivolumab.

<Dispersion of Cell Structure>

Next, the cell structure that has been cultured was dispersed at the cell level. Specifically, a suitable amount of tris buffer solution (50 mM, pH: 7.4) was added to the Transwell cell culture insert, and the liquid component was then removed. This series of processes was repeated 3 times. Subsequently, 300 μL of 0.25% trypsin-EDTA solution (produced by Invitrogen) was added to the Transwell cell culture insert, and incubation was performed in a $CO_2$ incubator (37° C., 5% $CO_2$) for 15 minutes. Thereafter, all of the solution was collected, and transferred to a 1.5-mL collection tube to which 300 μL of 0.25% trypsin-EDTA solution (produced by Invitrogen) had been previously added. Then, 100 μL of 0.25% trypsin-EDTA solution (produced by Invitrogen) was added to the Transwell cell culture insert, and incubation was performed, together with the 1.5-mL collection tube, in a $CO_2$ incubator (37° C., 5% $CO_2$) for 5 minutes. Thereafter, all of the solution was collected and transferred to a 1.5-mL collection tube. Then, 300 μL of 0.25% trypsin-EDTA solution (produced by Invitrogen) was added, and incubation was performed in a $CO_2$ incubator (37° C., 5% $CO_2$) for 5 minutes to thereby obtain a cell structure dispersion.

<Living Cell Count Analysis and Evaluation>

After the obtained cell structure dispersion was immersed in a trypan blue solution for trypan blue staining, the number of cells emitting fluorescence and not stained with trypan blue was counted as the number of living cancer cells. The cell count was performed using a cell counter "Countess II" (produced by Life Technologies) in fluorescence mode.

Furthermore, the 2D cultures and the spheroids were also stained with trypan blue by using a cell structure dispersion in the same manner, and the number of living cancer cells was counted. Measurements were repeated three times for each culture condition.

The CNT (remaining living cell rate) (%) of each culture was calculated based on the following formula, and used as an evaluation value.

CNT (%)=[the number of living cancer cells]/[the number of living cancer cells in culture in the absence of drug]×100

Table 1 shows the calculated CNT results of each culture, together with the number of constituting cells. In the table, the "2D" row shows the results of the 2D cultures, the "Spheroid" row shows the results of the spheroids, and the "3D" row shows the results of the produced cell structures having a blood vessel network.

TABLE 1

| Structure | Immune cells PBMC | Drug Nivolumab | CNT (%) Average value | Median value | S.D. |
|---|---|---|---|---|---|
| 2D | — | 2 μg | 100.0 | 98.1 | 16.83 |
| | 2 × 10⁵ cells | — | 78.5 | 75.6 | 4.97 |
| | 2 × 10⁵ cells | 2 μg | 73.8 | 75.6 | 5.71 |
| Spheroid | — | 2 μg | 100.0 | 98.1 | 16.83 |
| | 2 × 10⁵ cells | — | 78.5 | 75.6 | 4.97 |
| | 2 × 10⁵ cells | 2 μg | 73.8 | 75.6 | 5.71 |
| 3D | — | 2 μg | 99.5 | 94.5 | 9.91 |
| | 2 × 10⁵ cells | — | 78.4 | 79.2 | 1.48 |
| | 2 × 10⁵ cells | 2 μg | 55.0 | 54.2 | 5.97 |

The result shows that, in single administration of nivolumab, the CNT was of the order of 100% for each of the 2D culture, the spheroid, and the cell structure, and no anticancer effect was observed. When PBMC alone was seeded, the CNT was of the order of 78% for each of the 2D culture, the spheroid, and the cell structure. The same degree of anticancer effects were obtained. In combined administration of PBMC and nivolumab, the CNT was of the order of 78% for both the 2D culture and the spheroid. The anticancer effect was similar to that when PBMC alone was seeded. On the other hand, in combined administration of PBMC and nivolumab, the CNT was of the order of 55% for the cell structure having a blood vessel network structure, which was significantly smaller than that when PBMC alone was seeded, and an anticancer effect was observed.

NPL 5 reports that, in PDX animal models, single administration of nivolumab (anti-PD-1 antibody) had no anticancer effect, and that combined administration of PBMC and nivolumab was more effective than single administration of PBMC. Further, NPL 6 reports that, in the patients having microsatellite instability similar to the colorectal cancer cell line used in this example, nivolumab administration increased the median values of the patients' relapse-free survival period and overall survival period.

As seen from Table 1, when cell structures having a blood vessel network structure were used, single administration of nivolumab had no anticancer effect as with the animal models in NPL 6, and combined administration of PBMC and nivolumab was more effective than single administration of PBMC. Moreover, an anticancer effect of nivolumab was observed in the presence of immune cells (PBMC), as with the human example in NPL 5. This suggested the possibility that the evaluation method according to the present embodiment can more accurately predict the results of animal models and human clinical results.

Example 2

The effect of healthy human-derived immune cells and an anticancer drug (cancer immune checkpoint inhibitor) was evaluated in the same manner as Example 1 by using two types of cancer cells that are different in expression level of PD-L1 protein involved in nivolumab action mechanism.

The cell structure containing cancer cells and a blood vessel network structure used in this example was a cell structure in which a cancer cell layer, which was formed from NCI-H1975 (ATCC No.: CRL-5908), which is a human non-small cell lung cancer cell line with high PD-L1 protein expression level, or A549 (ATCC No.: CCL-185), which is an alveolar basal epithelial adenocarcinoma cell line with low PD-L1 protein expression level, was disposed on a top surface of a multi-layered structure formed from two types of cells, i.e., NHDF and HUVEC used in Example 1.

Further, the cell culture container, the culture medium, PBMC, and nivolumab were the same as those used in Example 1.

<Confirmation Test for PD-L1 Protein Expression Level in NCI-H1975 and A549>

For NCI-H1975 and A549 used in this example, PD-L1 protein expression level was detected.

FIG. 1 shows a comparison result of PD-L1 expression level by gel electrophoresis using Western blotting, as a confirmation test in Example 2, between NCI-H1975, which is a human non-small cell lung cancer cell line with high PD-L1 protein expression level, and A549, which is an alveolar basal epithelial adenocarcinoma cell line with low PD-L1 protein expression level.

The Western blotting procedure in measuring PD-L1 expression level was as follows.

<Western Blotting Method>

For PD-L1 detection of NCI-H1975 and A549 by Western blotting, an anti-PD-L1 antibody (E1L3N (registered trademark), produced by CST) was used.

After NCI-H1975 and A549 were cultured, the cells were dissolved in a lysis buffer to obtain a cell extract. Electrophoresis (SDS-PAGE) was performed by using the obtained cell extract so that protein contained in the extract was isolated according to the size, and then transferred to a PVDF membrane. Thus, PD-L1 was detected by Western blotting.

The β-actin shown in FIG. 1 is an endogenous control (internal standard).

<Results of PD-L1 Measurement by Western Blotting>

As shown in FIG. 1, a PD-L1 band was detected in NCI-H1975 used in this example, whereas it was not detected in A549.

That is, the test performed by Western blotting revealed that NCI-H1975 used in this example had high PD-L1 protein expression level, and A549 used in this example had low PD-L1 protein expression level.

<Evaluation Test for Effects of Healthy Human-Derived Immune Cells and Anticancer Drug (Cancer Immune Checkpoint Inhibitor) by Using NCI-H1975 and A549>

Next, a cell structure having a cancer cell layer on the top surface and containing a blood vessel network structure was produced in the same manner as Example 1, and cultured in the presence of PBMC and nivolumab. Then, the number of living cancer cells in the cell structure that had been cultured was counted in the same manner as Example 1 to calculate CNT (%). Measurements were repeated three times for each culture condition. The results are shown in Table 2.

TABLE 2

| Type of cells | Immune cells PBMC | Drug Nivolumab | CNT (%) Average value | Median value | S.D. |
|---|---|---|---|---|---|
| NCI-H1975 | $2 \times 10^5$ cells | — | 70.8 | 73.2 | 10.86 |
| | $2 \times 10^5$ cells | 2 µg | 33.1 | 33.1 | 7.08 |
| A549 | $2 \times 10^5$ cells | — | 56.7 | 51.0 | 12.32 |
| | $2 \times 10^5$ cells | 2 µg | 55.7 | 59.5 | 9.12 |

The result shows that, in NCI-H1975 with high PD-L1 protein expression level, the CNT was of the order of 70% when PBMC alone was seeded, whereas the CNT was of the order of 33% when combined administration of PBMC and nivolumab was performed. That is, in NCI-H1975, when combined administration of PBMC and nivolumab was performed, the CNT was significantly smaller than when PBMC alone was administered, and a higher anticancer effect was observed. On the other hand, in A549 with low PD-L1 protein expression level, the CNT when PBMC alone were seeded and the CNT when combined administration of PBMC and nivolumab was performed were substantially the same and of the order of 55%, and anticancer effect by nivolumab was not observed. Due to the action mechanism of nivolumab, it is known that Nivolumab has an anticancer effect against cancer cells having high PD-L1 protein expression level, but has no anticancer effect against cancer cells having no PD-L1 protein expression. The results of this example are consistent with this knowledge of anticancer effect of nivolumab, and suggest that, according to the evaluation method of the present embodiment, an evaluation that correctly reflects the action mechanism of the anticancer drug can be performed.

Example 3

The effect of healthy human-derived immune cells was evaluated by using a cell structure formed from fibroblasts, vascular endothelial cells, and cancer cells, and having a blood vessel network structure, and by varying the amount of healthy human-derived immune cells added to the cell structure.

The cell structure containing cancer cells and having a blood vessel network structure used in this example was a cell structure which was the same as that used in Example 2, that is, one in which a cancer cell layer formed from NCI-H1975 that was previously fluorescently labeled was disposed on a top surface of a multi-layered structure formed from two types of cells, i.e., NHDF and HUVEC.

Further, the cell culture container, the culture medium, PBMC, and nivolumab were the same as those used in Example 1.

A cell structure having a cancer cell layer on the top surface, and containing a blood vessel network structure was produced in the same manner as Example 1, and cultured in the presence of nivolumab and the number of cells described in Table 3 of PBMC. Then, the number of living cancer cells in the cell structure that had been cultured was counted in the same manner as Example 1 to calculate CNT (%). Measurements were repeated three times for each culture condition. The results are shown in Table 3.

TABLE 3

| Immune cells PBMC | Drug Nivolumab | CNT (%) | | |
| --- | --- | --- | --- | --- |
| | | Average value | Median value | S.D. |
| $2 \times 10^4$ cells | — | 93.4 | 93.0 | 3.11 |
| | 2 µg | 85.3 | 82.7 | 4.51 |
| $2 \times 10^5$ cells | — | 77.5 | 73.5 | 9.83 |
| | 2 µg | 45.9 | 45.9 | 3.03 |
| $2 \times 10^6$ cells | — | 66.1 | 65.8 | 4.64 |
| | 2 µg | 38.3 | 39.5 | 4.64 |
| $2 \times 10^7$ cells | — | 70.2 | 68.6 | 9.52 |
| | 2 µg | 38.0 | 39.5 | 4.22 |

The result shows that, the CNT decreased in a PBMC amount-dependent manner in both the cases where PBMC alone was seeded and where a combined administration of PBMC and nivolumab was performed. As seen from these results, it was suggested that both the anticancer effect of PBMC alone and the anticancer effect of combined use of PBMC and cancer immune checkpoint inhibitor are evaluated with sufficiently high accuracy by using a cell structure having a blood vessel network structure.

Example 4

The effect of healthy human-derived immune cells and an anticancer drug (cancer immune checkpoint inhibitor) was evaluated by using various cell structures, each having a cell layer formed from only cancer cells and located at different positions in the structure.
<Production of Cell Structures (4 types) for Evaluation of Effect of Healthy Human-Derived Immune Cells and Anticancer Drug>

Four types of cell structures were used as the cell structures containing cancer cells and a blood vessel network structure, which were used for evaluation of the effect of healthy human-derived immune cells and an anticancer drug. These cell structures had a multilayer structure (20 layers) formed from two types of cells, that is, NHDF and HUVEC used in Example 1, and the top surface, the second layer from the top surface, the fifth layer from the top surface, or the 10th layer from the top surface was provided as a cell layer formed from cancer cells.

NCI-H1975 (ATCC No.: CRL-5908), which is a human non-small cell lung cancer cell line, was used as the cancer cells. Further, the cell culture container, the culture medium, PBMC, and nivolumab were the same as those used in Example 1.
<Production of Structure in Which Cancer Cell Layer Was Provided on Top Surface of Cell Structure>

A cell structure having a cancer cell layer on the top surface and containing a blood vessel network structure was produced in the same manner as Example 1.
<Production of Structure in Which Cancer Cell Layer Was Provided at Position Other Than Top Surface of Cell Structure>

First, NHDF and HUVEC for a required layers were suspended in a tris-hydrochloric acid buffer containing heparin and collagen (0.1 mg/mL heparin, 0.1 mg/mL collagen, and 50 mM Tris; pH: 7.4) to prepare a cell suspension. The cell suspension was centrifuged at room temperature at 400×g for 1 minute to remove the supernatant, and then resuspended in an appropriate amount of medium.

Then, after the cell suspension was seeded in a Transwell cell culture insert, the Transwell cell culture insert was centrifuged at room temperature at 400×g for 1 minute. Subsequently, a suitable amount of culture medium was added to the Transwell cell culture insert, followed by culture in a $CO_2$ incubator (37° C., 5% $CO_2$) for 24 hours.

In the Transwell cell culture insert in which a structure was formed, $2 \times 10^5$ cancer cells suspended in an appropriate amount of culture medium were seeded, followed by culture in a $CO_2$ incubator (37° C., 5% $CO_2$) for 1 hour. The cancer cells used were previously fluorescently labeled (product number: PKH26GL, produced by SIGMA).

Further, NHDF and HUVEC for required layers were suspended in a tris-hydrochloric acid buffer containing heparin and collagen (0.1 mg/mL heparin, 0.1 mg/mL collagen, and 50 mM Tris; pH: 7.4) to prepare a cell suspension. The cell suspension was centrifuged at room temperature at 400×g for 1 minute to remove the supernatant, and then resuspended in an appropriate amount of medium. Then, after the cell suspension was seeded in a Transwell cell culture insert in which a structure containing a cancer cell layer was formed, the Transwell cell culture insert was centrifuged at room temperature at 400×g for 1 minute. Subsequently, a suitable amount of culture medium was added to the Transwell cell culture insert, followed by culture in a $CO_2$ incubator (37° C., 5% $CO_2$) for 96 hours. After completion of the culture, a cell structure was obtained in which a cancer cell layer was disposed at a position other than the top surface.
<Confirmation Test of Cancer Cell Layer Formation in Cell Structures (3 Types)>

Confirmation tests were performed to determine whether a cancer cell layer was formed at the intended position in a cell structure by the method according to this example.

Further, in the confirmation tests, in cell structures having 20 layers prepared by the method described in this example, the cell structures were produced to include (1) a cell structure having a cancer cell layer on the top surface (20th layer), (2) a cell structure having a cancer cell layer in the 10th layer from the top surface, and (3) a cell structure having a cancer cell layer in the 20th layer from the top surface (first layer of the cell structure).

The confirmation tests for formation of a cancer cell layer were performed in which, for the sections of the respective cell structures, all nuclei of NHDF, HUVEC, and cancer cells were stained by hematoxylin stain, CK7 highly expressed in cancer cells was stained by immunostaining, and imaging was performed by known techniques. For CK7 detection, an anti-CK7 antibody (clone: EPR17078, produced by Abcam) was used.

FIGS. 2A-2C correspond to the confirmation test in Example 4, (a) shown in FIG. 2A is a cross-sectional image of a cell structure, in which a cancer cell layer is formed on the top surface, (b) shown in FIG. 2B is a cross-sectional image of a cell structure, in which a cancer cell layer is formed in the 10th layer from the top surface, and (c) shown in FIG. 2C is a cross-sectional image of a cell structure, in which a cancer cell layer is formed in the 20th layer from the top surface.

In FIGS. 2A-2C, the arrows indicate the locations where cancer cells were observed by immunostaining.

As indicated by the arrow in FIG. 2A, staining of cancer cell-derived CK7 was observed on the top surface of the section of the cell structure.

Further, as indicated by the arrow in FIG. 2B, staining of cancer cell-derived CK7 was observed in the vicinity of the 10th layer from the top surface of the section of the cell structure (near the center of the cell structure in the thickness direction).

Further, as indicated by the arrow in FIG. 2C, staining of cancer cell-derived CK7 was observed in the vicinity of the 20th layer from the top surface of the cell structure.

As seen from the images of the sections shown in FIGS. 2A-2C, according to the method of this example, it was confirmed that a cancer cell layer was formed at an intended position in the cell structure.

<Culture in Presence of PBMC and Nivolumab, Living Cell Count Analysis, and Evaluation>

The four types of cell structures (top surface, second layer from the top surface, fifth layer from the top surface, and 10th layer from the top surface) obtained in the above <Production of Cell Structures (4 types) for Evaluation of Effect of Healthy Human-Derived Immune Cells and Anti-cancer Drug> were each cultured in the presence of PBMC and nivolumab.

Then, the number of living cancer cells in the cell structure that had been cultured was counted in the same manner as Example 1 to calculate CNT (%). Measurements were repeated three times for each culture condition. The results are shown in Table 4.

TABLE 4

| Position of cancer cell layer | Immune cells PBMC | Drug Nivolumab | CNT (%) Average value | CNT (%) Median value | CNT (%) S.D. | ΔCNT (Single-Combination) |
|---|---|---|---|---|---|---|
| Top surface | 2 × 10⁵ cells | — | 77.5 | 73.5 | 9.83 | 31.6 |
|  | 2 × 10⁵ cells | 2 μg | 45.9 | 45.9 | 3.03 |  |
| Second layer from top surface | 2 × 10⁵ cells | — | 85.0 | 81.6 | 16.96 | 32.5 |
|  | 2 × 10⁵ cells | 2 μg | 52.5 | 49.6 | 7.72 |  |
| Fifth layer from top surface | 2 × 10⁵ cells | — | 90.7 | 90.4 | 4.26 | 28.4 |
|  | 2 × 10⁵ cells | 2 μg | 62.3 | 70.4 | 24.10 |  |
| Tenth layer from top surface | 2 × 10⁵ cells | — | 89.5 | 93.4 | 18.69 | 11.2 |
|  | 2 × 10⁵ cells | 2 μg | 78.3 | 77.0 | 12.60 |  |

The result shows that, in the cell structure having a cancer cell layer on the top surface of the structure, the CNT was of the order of 75% when PBMC alone was seeded, whereas the CNT was of the order of 46% when a combined administration of PBMC and nivolumab was performed. That is, when a combined administration of PBMC and nivolumab was performed, the CNT was smaller by 31.6% than when PBMC alone was administered, and an anticancer effect by nivolumab was observed. In the cell structure having a cancer cell layer located in the second layer from the top surface of the structure, the CNT was of the order of 85% when PBMC alone was seeded, whereas the CNT was of the order of 50% when a combined administration of PBMC and nivolumab was performed. That is, when a combined administration of PBMC and nivolumab was performed, the CNT was smaller by 32.5% than when PBMC alone was administered, and an anticancer effect by nivolumab was observed. In the cell structure having a cancer cell layer located in the fifth layer from the top surface of the structure, the CNT was of the order of 90% when PBMC alone was seeded, whereas the CNT was of the order of 62.3% when a combined administration of PBMC and nivolumab was performed. That is, when a combined administration of PBMC and nivolumab was performed, the CNT was smaller by 28.4% than when PBMC alone was administered, and an anticancer effect by nivolumab was observed. In the cell structure having a cancer cell layer located in the 10th layer from the top surface of the structure (at a position approximately half of the thickness of the structure), the CNT was of the order of 90% when PBMC alone was seeded, whereas the CNT was of the order of 80% when a combined administration of PBMC and nivolumab was performed. That is, when a combined administration of PBMC and nivolumab was performed, the CNT was smaller by 11.2% than when PBMC alone was administered, and an anticancer effect by nivolumab was observed. As the position of the cancer cell layer in the thickness direction of the cell structure becomes deeper (farther) from the top surface of the structure, the tendency was observed that the anticancer effect decreases in both the single administration of PBMC and the combined administration of PBMC and nivolumab. As seen from these results, by using the cell structures each including a cancer cell layer located at different positions in the thickness direction of the cell structure in the evaluation method according to the present embodiment, the possibility of predicting the anticancer effect together with the ability of PBMC to reach the cancer cell layer in the multicellular layer was suggested.

Example 5

The effect of healthy human-derived immune cells and an anticancer drug (cancer immune checkpoint inhibitor) was evaluated by using a cell structure formed from fibroblasts, vascular endothelial cells, and cancer cells, and having a blood vessel network structure in the same manner as Example 1, except that NCI-H1975 with high PD-L1 protein expression level (the same NCI-H1975 as that used in Examples 2 to 4) was used as cancer cells, and atezolizumab, which is an anti-PD-L1 antibody, was used as the anticancer drug instead of nivolumab, and the dose of atezolizumab was 0.75 μg. The cell structure containing cancer cells and a blood vessel network structure used in this example was a cell structure in which a cancer cell layer, which was formed from NCI-H1975 (ATCC No.: CRL-5908), which is a human non-small cell lung cancer cell line with high PD-L1 protein expression level, which is the same as that used in Examples 2 to 4, was disposed on a top surface of a multilayer structure formed from two types of cells, i.e., NHDF and HUVEC used in Example 1.

Further, atezolizumab, which is an anti-PD-L1 antibody, was used as the anticancer drug (cancer immune checkpoint inhibitor) instead of nivolumab.

The cell culture container, the culture medium, and PBMC were the same as those used in Example 1.

A cell structure having a cancer cell layer on the top surface and containing a blood vessel network structure was produced in the same manner as Example 1, and cultured in the presence of PBMC and atezolizumab.

Then, the number of living cancer cells in the cell structure that had been cultured was counted in the same manner as Example 1 to calculate CNT (%). Measurements were repeated three times for each culture condition. The results are shown in Table 5.

TABLE 5

| Structure | Immune cells PBMC | Drug Atezolizumab | CNT (%) Average value | Median value | S.D. |
|---|---|---|---|---|---|
| 2D | — | — | 100.00 | 99.80 | 0.43 |
| | $2 \times 10^5$ cells | — | 83.86 | 82.80 | 4.72 |
| | $2 \times 10^5$ cells | 0.75 µg | 86.45 | 86.31 | 1.08 |
| 3D | — | — | 100.00 | 98.09 | 12.76 |
| | $2 \times 10^5$ cells | — | 86.16 | 86.60 | 19.06 |
| | $2 \times 10^5$ cells | 0.75 µg | 74.82 | 75.55 | 11.19 |

Table 5 also shows reference examples in which the CNT is approximately 100% in both the 2D culture and the cell structure in the samples to which neither PBMC nor atezolizumab was administered.

As shown in Table 5, when PBMC alone was seeded, the CNT was of the order of 85% for each of the 2D culture and the cell structure, and the same degree of anticancer effects were obtained.

In combined administration of PBMC and atezolizumab, the CNT was of the order of 86% for the 2D culture, and the anticancer effect was similar to that when PBMC alone was seeded.

On the other hand, in combined administration of PBMC and atezolizumab, the CNT was of the order of 75% for the cell structure having a blood vessel network structure, which was significantly smaller than that when PBMC alone was seeded, and an anticancer effect was observed.

According to this example, it was found that, even when atezolizumab was used instead of nivolumab, an excellent anticancer effect was observed in combined administration of PBMC and atezolizumab when a 3D cell structure was used.

The results of this example are consistent with the knowledge of the anticancer effect of atezolizumab.

That is, the results of this example showed that the anticancer effect can be correctly evaluated by using the evaluation method of the present embodiment, even if an anticancer drug other than nivolumab was used.

Example 6

The effect of lung cancer patient-derived immune cells and an anticancer drug (cancer immune checkpoint inhibitor) was evaluated by using a cell structure formed from fibroblasts, vascular endothelial cells, and cancer cells, and having a blood vessel network structure in the same manner as Example 1, except that NCI-H1975 or A549 was used as the cancer cells, lung cancer patient-derived PBMC was used as the immune cells to be evaluated instead of the healthy human-derived PBMC, and the dose of nivolumab was 0.3 µg.

The cell structure containing cancer cells and a blood vessel network structure used in this example was a cell structure in which a cancer cell layer, which was formed from NCI-H1975 (ATCC No.: CRL-5908), which is a human non-small cell lung cancer cell line with high PD-L1 protein expression level, or A549 (ATCC No.: CCL-185), which is an alveolar basal epithelial adenocarcinoma cell line with low PD-L1 protein expression level, was disposed on a top surface of a multi-layered structure formed from two types of cells, i.e., NHDF and HUVEC used in Example 1.

In this example, a cell structure was produced in the same manner as in the <Culture in Presence of PBMC and Nivolumab> in Example 1, except that lung cancer patient-derived peripheral blood mononuclear cell (PBMC) was used, and cultured in the presence of lung cancer patient-derived PBMC and nivolumab.

Moreover, for comparison, in place of the above cell structures, cells produced by culturing cancer cells so as to form a single layer in a general culture container (2D method) in the same manner as Example 1, except that lung cancer patient-derived PBMC was used and NCI-H1975 or A549 was used, were cultured in the presence of lung cancer patient-derived PBMC and nivolumab.

Further, the cell culture container, the culture medium, and nivolumab were the same as those used in Example 1.

Then, the number of living cancer cells in the cell structure that had been cultured was counted in the same manner as Example 1 to calculate CNT (%). Measurements were repeated three times for each culture condition.

The results are shown in Table 6.

TABLE 6

| Type of cells | Structure | Immune cells Patient-derived PBMC | Drug Nivolumab | CNT (%) Average value | Median value | S.D. |
|---|---|---|---|---|---|---|
| NCI-H1975 | 2D | — | — | 100.00 | 99.48 | 2.91 |
| | | $2 \times 10^5$ cells | — | 95.81 | 97.28 | 2.60 |
| | | $2 \times 10^5$ cells | 0.3 µg | 90.60 | 91.49 | 2.86 |
| | 3D | — | — | 100.00 | 100.69 | 12.99 |
| | | $2 \times 10^5$ cells | — | 79.07 | 77.85 | 6.06 |
| | | $2 \times 10^5$ cells | 0.3 µg | 65.92 | 64.36 | 4.61 |
| A549 | 2D | — | — | 100.00 | 99.12 | 1.96 |
| | | $2 \times 10^5$ cells | — | 95.36 | 94.78 | 1.81 |
| | | $2 \times 10^5$ cells | 0.3 µg | 91.11 | 89.74 | 4.70 |
| | 3D | — | — | 100.00 | 98.09 | 16.84 |
| | | $2 \times 10^5$ cells | — | 86.92 | 89.92 | 10.54 |
| | | $2 \times 10^5$ cells | 0.3 µg | 84.74 | 81.74 | 7.42 |

The result shows that, when the 3D cell structure was used, in NCI-H1975 with high PD-L1 protein expression level, the CNT was of the order of 79% when lung cancer patient-derived PBMC alone was seeded, whereas the CNT was of the order of 66% when a combined administration of lung cancer patient-derived PBMC and nivolumab was performed. That is, when the 3D cell structure was used, in NCI-H1975, the CNT was significantly smaller when a combined administration of lung cancer patient-derived PBMC and nivolumab was performed than when lung cancer patient-derived PBMC alone was administered, and a higher anticancer effect was observed.

On the other hand, in both cases where cells produced by culturing NCI-H1975 as cancer cells so as to form a single layer in a general culture container (2D method) were cultured in the presence of lung cancer patient-derived PBMC alone, and where the cells were cultured in the presence of lung cancer patient-derived PBMC and nivolumab, a sufficient anticancer effect was not observed.

Further, when the 3D cell structure was used, in A549 with low PD-L1 protein expression level, the CNT when lung cancer patient-derived PBMC alone were seeded and the CNT when a combined administration of lung cancer patient-derived PBMC and nivolumab was performed were substantially the same and of the order of 85%, and anticancer effect by nivolumab was not observed.

In addition, in both cases where cells produced by culturing cancer cells by using A549 so as to form a single layer in a general culture container (2D method) were cultured in the presence of lung cancer patient-derived PBMC alone, and where the cells were cultured in the presence of lung cancer patient-derived PBMC and nivolumab, a sufficient anticancer effect was not observed.

As described above, only when NCI-H1975 was used as cancer cells and a cell structure having a 3D structure was used, there was a significant difference in the evaluation results due to the presence or absence of nivolumab.

The results of this example are consistent with the knowledge that nivolumab has an anticancer effect against cancer cells having high PD-L1 protein expression level, but has no anticancer effect against cancer cells having no PD-L1 protein expression.

These results suggest that, according to the evaluation method of the present embodiment, an evaluation of anticancer effect that correctly reflects the action mechanism of the anticancer drug can be performed even when patient-derived PBMC was used.

Example 7

The effect of immune cells and an anticancer drug (cancer immune checkpoint inhibitor) was evaluated by using a cell structure formed from fibroblasts, vascular endothelial cells, and cancer cells, and having a blood vessel network structure in the same manner as Example 1, except that NUGC-3 (JCRB No.: JCRB0822), which is human gastric cancer cells or MKN-1 (JCRB No.: JCRB0252), which is also human gastric cancer cells were used as two types of cancer cells having different PD-L1 protein expression levels involved in the nivolumab action mechanism, and the dose of nivolumab was 0.3 μg.

The cell structure containing cancer cells and a blood vessel network structure used in this example was a cell structure in which a cancer cell layer, which was formed from human gastric cancer cells NUGC-3 with high PD-L1 protein expression level, or human gastric cancer cells MKN-1 with low PD-L1 protein expression level, was disposed on a top surface of a multi-layered structure formed from two types of cells, i.e., NHDF and HUVEC used in Example 1.

Further, the cell culture container, the culture medium, PBMC, and nivolumab were the same as those used in Example 1.

A cell structure (3D structure) having a cancer cell layer on the top surface and containing a blood vessel network structure was produced in the same manner as Example 1, and cultured in the presence of PBMC and nivolumab. Then, the number of living cancer cells in the cell structure that had been cultured was counted in the same manner as Example 1 to calculate CNT (%). Measurements were repeated three times for each culture condition. The results are shown in Table 7.

TABLE 7

| Type of cells | Immune cells PBMC | Drug Nivolumab | CNT (%) Average value | CNT (%) Median value | S.D. |
|---|---|---|---|---|---|
| NUGC-3 | — | — | 100.00 | 102.70 | 9.04 |
|  | 2 × 10$^5$ cells | — | 83.52 | 83.52 | 9.80 |
|  | 2 × 10$^5$ cells | 0.3 μg | 72.87 | 73.72 | 3.91 |
| MKN-1 | — | — | 100.00 | 94.38 | 12.76 |
|  | 2 × 10$^5$ cells | — | 87.64 | 86.20 | 19.06 |
|  | 2 × 10$^5$ cells | 0.3 μg | 85.55 | 87.64 | 16.66 |

The result shows that, in NUGC-3 with high PD-L1 protein expression level, the CNT was of the order of 84% when PBMC alone was seeded, whereas the CNT was of the order of 73% when a combined administration of PBMC and nivolumab was performed.

That is, in NUGC-3, when a combined administration of PBMC and nivolumab was performed, the CNT was smaller than when PBMC alone was administered, and a tendency of higher anticancer effect was observed.

On the other hand, in MKN-1 with low PD-L1 protein expression level, the CNT when PBMC alone were seeded and the CNT when a combined administration of PBMC and nivolumab was performed were substantially the same and of the order of 86%, and anticancer effect by nivolumab was not observed.

Due to the action mechanism of nivolumab, it is known that Nivolumab has an anticancer effect against cancer cells having high PD-L1 protein expression level, but has no anticancer effect against cancer cells having no PD-L1 protein expression.

The results of this example are consistent with this knowledge of the anticancer effect of nivolumab, and suggest that, according to the evaluation method of the present embodiment, an evaluation that correctly reflects the action mechanism of the anticancer drug can be performed even with a cancer type such as gastric cancer, which is different from lung cancer.

Embodiments of the present invention have so far been described. However, configurations, combinations of the configurations, and the like of the embodiments are only examples, and additions, omissions, substitutions, or any other changes in configurations may be made without departing from the spirit of the present invention. Further, the present invention should not be limited by these embodiments.

INDUSTRIAL APPLICABILITY

The evaluation method according to the present embodiment is an evaluation method by which more reliable evaluation can be obtained without using animal models for the anticancer effect of an anticancer drug combined with the effect of the immune system. Therefore, the evaluation method can be applied to new drug development and drug-repositioning screening in the field of drug discovery, or screening and determination of treatment methods in the clinical field.

The present application addresses the following. When the drug efficacy evaluation of a drug is performed in the in vitro evaluation system, the reliability of the evaluation obtained may be a problem. That is, it is important tht the evaluation in the evaluation system reflects drug efficacy obtained when the drug is actually administered to an organism. In a highly reliable evaluation system, the evaluation in the in vitro evaluation system is highly likely to match the effect obtained by administration into an organism.

When the drug efficacy evaluation including an immune system is performed in the in vitro evaluation system, it is important that the immune cell system actually has the same physiological activity as in vivo. However, in the method described in PTL 1, since the cancer cells are cultured while being fixedly supported in the liquid mass of collagen gel, the interaction between the stroma and the cancer cells cannot be observed. The above method, in which a stroma is not included, cannot be regarded as reproducing the actual cancer microenvironment, and thus the reliability of the resulting evaluation may be low.

In particular, it is said that, for the effects of the anti-PD-1 antibody drug, cytotoxic T cells need to be infiltrated into the vicinity of the tumor tissue (NPL 3). For this reason, in observation of the effects of the anti-PD-1 antibody drug in vitro, it is necessary to take this point into consideration, but there is no such method yet.

The present invention has an aspect of providing a method for evaluating the anticancer effect of an anticancer drug or the like, which is performed in an in vitro system including an immune system, in a more reliable manner without using animal models, and a method for predicting effectiveness of cancer immunotherapy using the evaluation method.

In order to solve the above problems, the present inventors conducted extensive research on cell culture methods, and found that, when an assay system in the evaluation test of anticancer activity including the immune system mimics the in vivo environment, it was possible to reproduce a state in which the evaluation target would actually act as in vivo, and to obtain evaluation reflecting the drug efficacy obtained when the drug was actually administered into an organism. Specifically, the present inventors found that it was possible to obtain more reliable evaluation for the drug efficacy of the anticancer drug by administering immune cells and the anticancer drug into a structure in which cancer cells were organized, while making them coexist with the stroma such as endothelial cells and fibroblasts coexisting with the cancer cells in the in vivo environment. Thus, the present invention has been produced.

(1) According to a first aspect of the present invention, a method for evaluating anticancer effect includes: a culture step of culturing a cell structure containing cells constituting a stroma, the cells constituting a stroma being other than immune cells, and cancer cells, in the presence of immune cells and an anticancer drug; and an evaluating step of evaluating anticancer effect of the anticancer drug or the immune cells using, as an indicator, the number of living cancer cells in the cell structure after the culture step.

(2) The cell structure may contain at least one selected from the group consisting of vascular endothelial cells and lymphatic endothelial cells, as the cells constituting a stroma being other than immune cells.

(3) The cell structure may contain at least one selected from the group consisting of fibroblasts, neuronal cells, mast cells, epithelial cells, myocardial cells, hepatic cells, pancreatic islet cells, tissue stem cells, and smooth muscle cells, as cells constituting a stroma being other than immune cells.

(4) The cell structure may have a thickness of 5 μm or more.

(5) The cell structure may include a vascular network structure.

(6) The cancer cells may be located in a limited cell layer in the cell structure.

(7) The cancer cells may be scattered in the cell structure.

(8) The immune cells may be at least one selected from the group consisting of leukocytes and lymphocytes.

(9) The immune cells may be plasma peripheral blood mononuclear cells.

(10) The anticancer drug may be a cancer immune checkpoint inhibitor.

(11) According to a second aspect of the present invention, a kit for use in the method for evaluating anticancer effect according to the above aspect includes: at least one type of cell structure containing cells constituting a stroma, the cells constituting a stroma being other than immune cells, and cancer cells, the cell structure having a thickness of 5 μm or more; and a cell culture vessel that individually accommodates the cell structure.

(12) According to a third aspect of the present invention, a method for predicting effectiveness of cancer immunotherapy includes: a culture step of culturing a cell structure including a cell layer containing cancer cells in the presence of immune cells and an anticancer drug, and a prediction step of predicting effectiveness of cancer immunotherapy using, as an indicator, the number of living cancer cells in the cell structure after the culture step, in which the cancer immunotherapy is performed by using at least one of the cancer cells and the immune cells, wherein the cell structure contains at least one type of cells constituting a stroma, the cells constituting a stroma being other than immune cells, and at least one of the cancer cells and the immune cells is derived from a cancer patient.

(13) In the culture step, two or more types of cell structures, each including a cancer cell layer located at different positions in a thickness direction of the cell structure, may be separately cultured in the presence of the immune cells and the anticancer drug.

(14) The anticancer drug may be a cancer immune checkpoint inhibitor.

(15) The immune cells may be plasma peripheral blood mononuclear cells.

(16) According to a fourth aspect of the present invention, a kit for use in the method for predicting effectiveness of cancer immunotherapy according to the above aspect includes: two or more types of cell structures each including a cell layer containing cancer cells located at different positions in the thickness direction of the cell structure; and a cell culture vessel that individually accommodates the cell structure, wherein the cell structure contains at least one type of cells constituting a stroma, the cells constituting a stroma being other than immune cells, and the cell layer containing cancer cells in the cell structure is located at a position within a range from a top surface to a middle of a thickness of the cell structure.

The method for evaluating anticancer effect and the method for predicting effectiveness of cancer immunotherapy according to the above aspects of the present invention evaluate the drug efficacy of an anticancer drug in the presence of an immune system by using, as an indicator, the influence on cancer cells which are present in a state closer to the in vivo environment, specifically cancer cells contained in a cell structure that contains a stroma. Therefore, highly reliable evaluation can be obtained even in the in vitro evaluation system.

Further, the kit for evaluating an anticancer drug or the kit for predicting effectiveness of cancer immunotherapy according to the above aspects of the invention can be used to perform the method for evaluating anticancer effect or the method for predicting effectiveness of cancer immunotherapy in a more convenient manner.

The invention claimed is:

1. A method for evaluating effectiveness of a cancer immunotherapy, comprising:
   providing a multi-layered cellular structure comprising at least 10 laminated stromal cell layers and a layer of cancer cells positioned between a pair of adjacent laminated stromal cell layers;
   culturing the multi-layered cellular structure in the presence of an anticancer drug and a plurality of immune cells for a culture period; and
   measuring the number of living cancer cells in the multi-layered cell structure after the culture period;
   wherein a reduction of the number of living cancer cells in the multi-layered cell structure after the culture period compared to the number of living cancer cells in a control multi-layered cell structure cultured in the absence of the anticancer drug indicates effectiveness of the cancer immunotherapy;
   wherein the multi-layered cellular structure has a thickness of at least 50 µm.

2. The method of claim 1, wherein the multi-layered cellular structure comprises at least 20 laminated stromal cell layers.

3. The method of claim 1, wherein the multi-layered cellular structure comprises from 10 to 60 laminated stromal cell layers.

4. The method of claim 3, wherein the multi-layered cellular structure comprises from 10 to 20 laminated stromal cell layers.

5. The method of claim 3, wherein the multi-layered cellular structure comprises from 20 to 60 laminated stromal cell layers.

6. The method of claim 1, wherein the stromal cells include fibroblasts and at least one endothelial cell type selected from vascular endothelial cells and lymphatic endothelial cells.

7. The method of claim 1, wherein the stromal cells include at least one selected from the group consisting of a fibroblast, neuronal cell, a mast cell, an epithelial cell, a myocardial cell, a hepatic cell, a pancreatic islet cell, a tissue stem cell, and a smooth muscle cell.

8. The method of claim 1, wherein the thickness of the multi-layered cellular structure is from 50 µm to 500 µm.

9. The method of claim 1, wherein the multi-layered cellular structure includes a vascular network structure.

10. The method of claim 1, wherein the immune cells are selected from a leukocyte and a lymphocyte.

11. The method of claim 1, wherein the immune cells comprise plasma peripheral blood mononuclear cells.

12. The method of claim 1, wherein the anticancer drug is a cancer immune checkpoint inhibitor.

13. The method of claim 1, wherein the stromal cells comprise a plurality of endothelial cells and a plurality of fibroblasts, and the ratio of endothelial cells to fibroblasts is from 0.1% to 5.0%.

14. The method according to claim 1, wherein the multi-layered cell structure includes a strong electrolyte polymer and an extracellular matrix component.

15. The method according to claim 14, wherein a ratio of the strong electrolyte polymer to the extracellular matrix component is in a range of 1:2 to 2:1.

16. The method according to claim 14, wherein the strong electrolyte polymer comprises heparin, and the extracellular matrix component comprises collagen.

* * * * *